US012693910B2

(12) United States Patent
Zhou

(10) Patent No.: US 12,693,910 B2
(45) Date of Patent: Jul. 28, 2026

(54) VIDEO APPLICATION KEEPALIVE METHOD AND ELECTRONIC DEVICE

(71) Applicant: Honor Device Co., Ltd., Shenzhen (CN)

(72) Inventor: Xiaolong Zhou, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 730 days.

(21) Appl. No.: 18/033,647

(22) PCT Filed: May 19, 2022

(86) PCT No.: PCT/CN2022/093745
§ 371 (c)(1),
(2) Date: Apr. 25, 2023

(87) PCT Pub. No.: WO2022/267765
PCT Pub. Date: Dec. 29, 2022

(65) Prior Publication Data
US 2023/0325260 A1　Oct. 12, 2023

(30) Foreign Application Priority Data
Jun. 26, 2021　(CN) .......................... 202110715306.5

(51) Int. Cl.
*G06F 9/54* (2006.01)
*G06F 9/451* (2018.01)

(52) U.S. Cl.
CPC .............. *G06F 9/542* (2013.01); *G06F 9/451* (2018.02)

(58) Field of Classification Search
USPC ......................................................... 719/320
See application file for complete search history.

(56) References Cited

U.S. PATENT DOCUMENTS

| | | | |
|---|---|---|---|
| 10,182,466 B2 | 1/2019 | Nirantar et al. | |
| 10,552,179 B2 | 2/2020 | Myrick et al. | |
| 11,243,784 B2 | 2/2022 | Kang et al. | |
| 2015/0264292 A1* | 9/2015 | Greene ................. | G06F 3/0488 386/248 |
| 2021/0342192 A1* | 11/2021 | Hamlin ................... | G06F 9/485 |
| 2022/0350450 A1 | 11/2022 | Li et al. | |

FOREIGN PATENT DOCUMENTS

| | | |
|---|---|---|
| AU | 2003266466 A1 | 6/2004 |
| CN | 108055408 A | 5/2018 |
| CN | 109992310 A | 7/2019 |

(Continued)

*Primary Examiner* — Chat C Do
*Assistant Examiner* — William C Wood
(74) *Attorney, Agent, or Firm* — Leydig, Voit & Mayer, Ltd.

(57) ABSTRACT

This application provides a video application keepalive method and an electronic device. The video application keepalive method includes: when running memory usage of a system exceeds a first threshold, the electronic device determines whether the first application is of a video type. In a case in which the first application is of a video type, it is determined whether the first application is in a video hold state. If the first application is in a video hold state, and the application meets a ranking condition, the electronic device keeps the first application alive within keepalive duration.

20 Claims, 21 Drawing Sheets

(56) References Cited

FOREIGN PATENT DOCUMENTS

| | | | |
|---|---|---|---|
| CN | 110489215 | A | 11/2019 |
| CN | 111193954 | A | 5/2020 |
| CN | 111615002 | A | 9/2020 |
| CN | 111857919 | A | 10/2020 |
| CN | 111913750 | A | 11/2020 |
| CN | 112988282 | A | 6/2021 |
| CN | 113535250 | A | 10/2021 |
| CN | 113741994 | A | 12/2021 |
| EP | 3008943 | | 4/2016 |
| WO | 2014200631 | A1 | 12/2014 |
| WO | 2015196967 | A1 | 12/2015 |
| WO | 2019019703 | A1 | 1/2019 |
| WO | 2021000807 | A1 | 1/2021 |

* cited by examiner

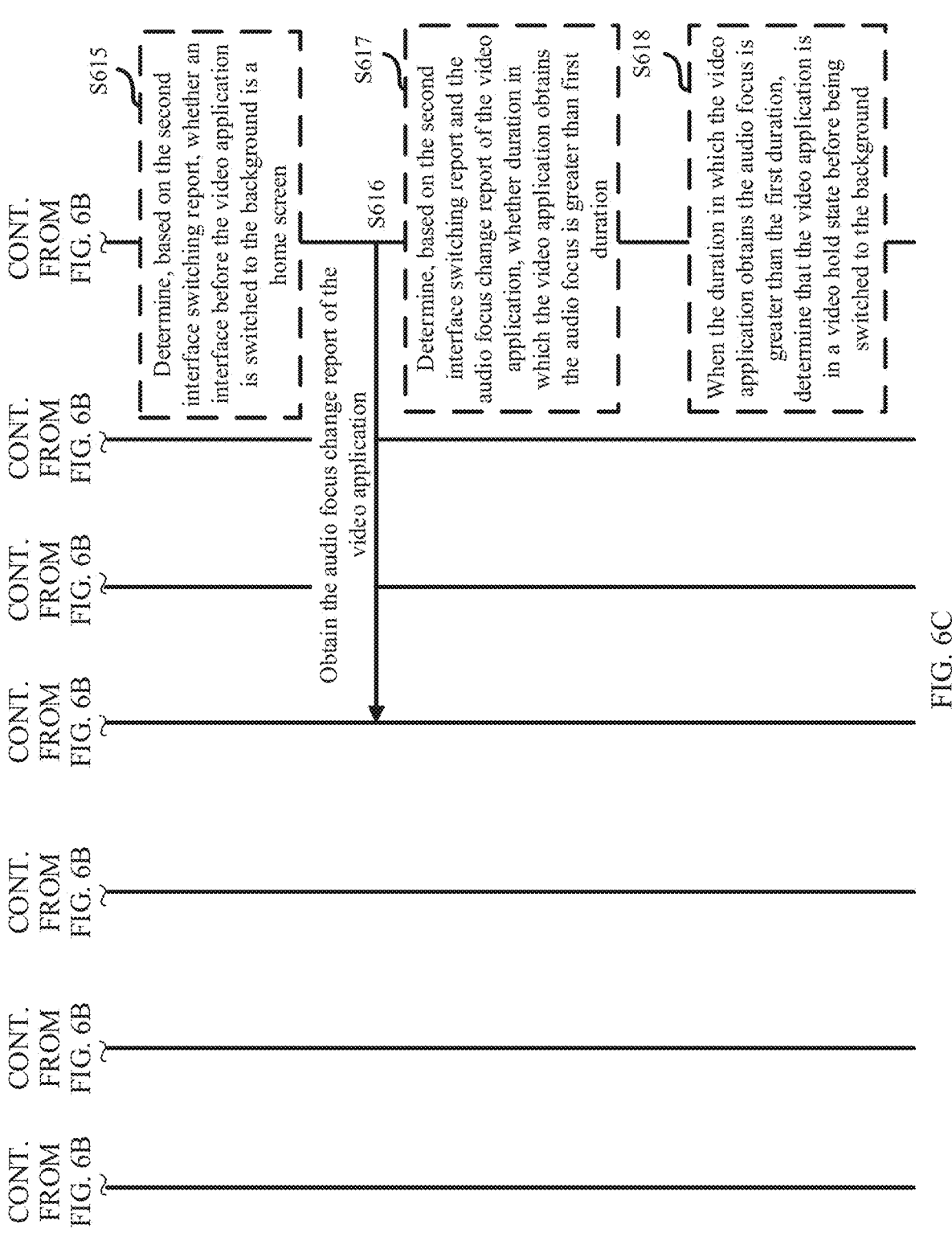

CONT. FROM FIG. 6B

CONT. FROM FIG. 6B

CONT. FROM FIG. 6B

CONT. FROM FIG. 6B

CONT. FROM FIG. 6B

CONT. FROM FIG. 6B

CONT. FROM FIG. 6B

S615

Determine, based on the second interface switching report, whether an interface before the video application is switched to the background is a home screen Obtain the audio focus change report of the video application

S616

S617

Determine, based on the second interface switching report and the audio focus change report of the video application, whether duration in which the video application obtains the audio focus is greater than first duration

S618

When the duration in which the video application obtains the audio focus is greater than the first duration, determine that the video application is in a video hold state before being switched to the background

FIG. 6C

VIDEO APPLICATION KEEPALIVE METHOD AND ELECTRONIC DEVICE

CROSS-REFERENCE TO RELATED APPLICATIONS

This application is a national stage of International Application No. PCT/CN2022/093745, filed on May 19, 2022, which claims priority to Chinese Patent Application No. 202110715306.5, filed on Jun. 26, 2021. The disclosures of both of the aforementioned applications are hereby incorporated by reference in their entireties.

TECHNICAL FIELD

This application relates to the field of application keepalive, and in particular, to a video application keepalive method and an electronic device.

BACKGROUND

A video application is a high-frequency application that is used daily by a user of a mobile phone. To use a video application to watch a video, the user generally performs steps of starting a video application, searching for a video, and watching an advertisement. When the user watches the video, cross-use of another application inevitably occurs. For example, when using a specific video software to watch a video, if the user needs to answer a call or reply to a message by using a communication software, the user transiently switches to another application. If there is a memory shortage in a system, the system may clear the video application to ensure normal use of the system. The user needs to perform steps of starting the video application, searching for the video, watching an advertisement, and find a progress of the previous video again to watch the previous video. This series of steps increase costs of the user to retrieve a previous playback state, and user experience is poor. Therefore, how to keep a playback state of a video application alive for a short time in a case in which a system is ensured to run normally in a system application clearing solution is a current and future research direction.

SUMMARY

Embodiments of this application provide a video application keepalive method. When a running memory of a system is short and a video application running in a background is a keepalive application program, a process of the application program is kept alive within keepalive duration. When the video application is switched back to a foreground within the keepalive duration, the video application may continue to play a video played before the video application is switched to the background. This resolves a problem that the process of the video application is cleared due to an insufficient system memory, and when a user reuses the video application, a large amount of time is consumed to restore a playback state before the video application is switched.

According to a first aspect, an embodiment of this application provides a video application keepalive method, applied to an electronic device, where the method includes: determining that memory usage of the electronic device is greater than a first threshold; determining an application type of a first application, where the first application is in a background running state; if the type of the first application is a video type, determining whether the first application is in a video hold state; and if the first application is in a video hold state, keeping a process of the first application alive within a keepalive time. In this way, when a running memory of a system is short, the first application is kept alive within keepalive duration. After the first application is re-switched to a foreground within the keepalive duration, the video application may continue to play a video played before the video application is switched to the background. This resolves a problem that the process of the video application is cleared due to an insufficient system memory, and when a user reuses the video application, a large amount of time is consumed to restore a playback state before the video application is switched.

With reference to the first aspect, in a possible implementation, before the determining that memory usage of the electronic device is greater than a first threshold, the method further includes: switching the first application on a first interface to run in the background.

With reference to the first aspect, in a possible implementation, after the keeping a process of the first application alive within a keepalive time, the method further includes: switching the first application to run in the foreground within the keepalive time; and displaying the first interface in the first application running in the foreground. In the foregoing embodiment, the first interface is a video playback interface. A video picture and audio played in the first interface of the first application that is switched back to the foreground are consistent with a video picture and audio before the first application is switched to the background.

With reference to the first aspect, in a possible implementation, the determining whether the first application is in a video hold state includes: when the first application is switched to run in the background, the first interface is not a home screen, and duration in which the first application obtains an audio focus exceeds first duration. In this way, the electronic device may determine that an interface before the first application is switched to the background is a video playback interface, and duration of playing the video is greater than the first duration.

With reference to the first aspect, in a possible implementation, after the determining that memory usage of the electronic device is greater than a first threshold, the method further includes: determining a system pressure level of the electronic device. In this way, in a case in which the first application is a keepalive application program, the first device may use a corresponding keepalive policy based on the system pressure level to keep the first application alive.

With reference to the first aspect, in a possible implementation, the keeping the process of the first application alive within a keepalive time includes: determining, based on the system pressure level, whether the first application meets a ranking condition; and if the ranking condition is met, keeping the process of the first application alive within the keepalive time. In this way, the electronic device may use different standards based on the system pressure level to determine whether the first application is a keepalive application program.

With reference to the first aspect, in a possible implementation, the system pressure level includes a first-level pressure and a second-level pressure, and the determining, based on the system pressure level, whether the first application meets a ranking condition includes: when the system pressure level of the electronic device is the first-level pressure, determining whether a ranking of the first application in a first application queue falls within a second threshold, where the first application queue includes applications of the same type as the first application; and if the ranking of the first application in the first application queue falls within the second threshold, determining that the first application meets the ranking condition; or when the system pressure level of the electronic device is the second-level pressure, determining whether a ranking of the first application in a first application queue falls within a third threshold; and if the ranking of the first application in the first application queue falls within the third threshold, determining that the first application meets the ranking condition. In this way, the electronic device may use different standards based on the system pressure level to determine whether the first application meets the ranking condition, so as to determine whether the first application is a keepalive application.

With reference to the first aspect, in a possible implementation, the electronic device includes a system status identification module, a resource management module, and a keepalive decision module, and the method includes: the system identification module obtains running memory usage of a current system from the resource management module; the system identification module determines that the running memory usage is greater than the first threshold; the system status identification module sends the running memory usage to the keepalive decision module; in response to receiving the running memory usage, the keepalive decision module obtains a system pressure coefficient by using the resource management module; the keepalive decision module determines whether the system pressure coefficient is greater than a fourth threshold; if the system pressure coefficient is greater than the fourth threshold, the keepalive decision module determines that a system status is a high-pressure state; in a case in which the system status is the high-pressure state, the keepalive decision module determines whether the running memory usage exceeds a fifth threshold; if the fifth threshold is exceeded, it is determined that the system pressure level is the first-level pressure; and if the fifth threshold is not exceeded, it is determined that the system pressure level is the second-level pressure. In this way, the keepalive decision module may determine, based on pressure of the system memory, whether the system should clear the memory, and determine a system pressure level when the system is in a high-pressure state, so that the keepalive decision module uses a corresponding keepalive policy (such as keepalive time) based on the system pressure level to keep the keepalive application program alive.

With reference to the first aspect, in a possible implementation, the electronic device includes the keepalive decision module and an application recognition module, and before the determining an application type of a first application, the method further includes: the keepalive decision module obtains the application type of the first application by using the application recognition module; and the determining an application type of a first application is specifically: the keepalive decision module determines, based on the application type, that the type of the first application is a video type. In this way, the keepalive decision module may determine that the first application is of a video type, so that the keepalive decision module determines, based on a method for determining whether a video application is a keepalive application program (the video application is in a video hold state and meets a ranking condition), whether the first application is a keepalive application program.

With reference to the first aspect, in a possible implementation, the electronic device further includes an audio focus recognition and an application switching recognition module, and the determining whether the first application is in a video hold state includes: the keepalive decision module obtains a second interface switching report from the application switching recognition module, where the second interface switching report includes at least a moment T2 at which the first application is switched to the background and identification information of the first interface; the keepalive decision module determines whether the identification information of the first interface is consistent with identification information of the home screen of the first application; if the two are consistent, the keepalive decision module determines that the first application is not in a video hold state; if the two are inconsistent, the keepalive decision module obtains an audio focus change report of the first application from the audio focus recognition module, where the audio focus change report includes at least a moment T1 at which the first application requests an audio focus; the keepalive decision module calculates a modulus value of T1 and T2; the keepalive decision module analyzes whether the modulus value is greater than or equal to the first duration; and if yes, the keepalive module determines that the first application is in a video hold state; or if no, the keepalive module determines that the first application is not in a video hold state. In this way, in a case in which the keepalive decision module determines that the first application is in a video hold state, the keepalive decision module determines whether the first application meets the ranking condition, to determine whether the first application meets a keepalive condition.

With reference to the first aspect, in a possible implementation, the determining, based on the system pressure level, whether the first application meets a ranking condition includes: in a case in which the system pressure level is the first-level pressure, the keepalive decision module determines whether the ranking of the first application in the first application queue falls within the second threshold, where the first application queue includes applications of the same type as the first application; and if yes, the keepalive decision module determines that the first application meets the ranking condition; or in a case in which the system pressure level is the second-level pressure, the keepalive decision module determines whether the ranking of the first application in the first application queue falls within the third threshold; and if yes, the keepalive decision module determines that the first application meets the ranking condition. In this way, the keepalive decision module may determine, based on whether the first application meets the ranking condition, whether the first application meets the keepalive condition, and if the keepalive condition is met, the first application may be kept alive within the keepalive duration.

With reference to the first aspect, in a possible implementation, the electronic device further includes an audio management module, and after the switching the first application to run in the foreground within the keepalive time, the method further includes: the first application requests an audio focus from the audio management module; and the audio management module allocates the audio focus to the first application. In this way, the first application that is re-switched back to the foreground obtains the audio focus again, and can play the audio.

With reference to the first aspect, in a possible implementation, the electronic device further includes an audio focus decision module, and after the keeping the process of the first application alive within a keepalive time includes: the keepalive decision module sends keepalive information of the first application to the audio focus decision module, where the keepalive information includes keepalive duration SaveTime. In this way, the audio focus decision module may determine, based on the keepalive information, whether the first application that is switched back to the foreground is a keepalive application program.

With reference to the first aspect, in a possible implementation, the electronic device further includes the audio management module, an event management module, and an interface management module. After the switching the first application to run in the foreground within the keepalive time, the method further includes: the interface management module sends a third interface switching report to the event management module, where the third interface switching report includes identification information of the first application, identification information of a second application program, and an interface switching moment T4; the event management module sends the third interface switching report to the application switching identification module; the application switching identification module determines that the identification information of the first application is inconsistent with the identification information of the second application program; the application switching identification module sends the third interface switching report to the audio focus decision module; the audio focus decision module calculates a modulus value of T4 and a moment T5 at which the keepalive information is received; in a cased in which the modulus value is greater than SaveTime, the audio decision management module sends a first request message to the event management module, where the first request message is used to instruct the audio management module to allocate the audio focus to the first application; the event management module sends the first request message to the audio management module; and the audio management module allocates the audio focus to the first application. In this way, the first application that is re-switched back to the foreground obtains the audio focus again, and can play the audio.

According to a second aspect, an embodiment of this application provides an electronic device, where the electronic device includes one or more processors and a memory. The memory is coupled to the one or more processors, the memory is configured to store a computer program code, the computer program code includes a computer instruction, and the one or more processors invoke the computer instruction so that the electronic device performs: determining that memory usage of the electronic device is greater than a first threshold; determining an application type of a first application, where the first application is in a background running state; if the type of the first application is a video type, determining whether the first application is in a video hold state; and if the first application is in the video hold state, keeping a process of the first application alive within a keepalive time.

With reference to the second aspect, in an implementation, the one or more processors are further configured to invoke the computer instruction, so that the electronic device performs: switching the first application on a first interface to run in a background.

With reference to the second aspect, in an implementation, the one or more processors are further configured to invoke the computer instruction, so that the electronic device performs: switching the first application to run at a foreground within the keepalive time; and displaying the first interface in the first application running in the foreground.

With reference to the second aspect, in an implementation, the one or more processors are further configured to invoke the computer instruction, so that the electronic device performs: determining a system pressure level of the electronic device.

With reference to the second aspect, in an implementation, the one or more processors are further configured to invoke the computer instruction, so that the electronic device performs: determining, based on the system pressure level, whether the first application meets a ranking condition; and if the ranking condition is met, keeping the process of the first application alive within the keepalive time.

With reference to the second aspect, in an implementation, the one or more processors are further configured to invoke the computer instruction, so that the electronic device performs: when the system pressure level of the electronic device is a first-level pressure, determining whether a ranking of the first application in a first application queue falls within a second threshold, where the first application queue includes applications of the same type as the first application; and if the ranking of the first application in the first application queue falls within the second threshold, determining that the first application meets the ranking condition; or when the system pressure level of the electronic device is a second-level pressure, determining whether a ranking of the first application in a first application queue falls within a third threshold; and if the ranking of the first application queue falls within the third threshold, determining that the first application meets the ranking condition.

With reference to the second aspect, in an implementation, the one or more processors are further configured to invoke the computer instruction so that the electronic device performs: obtaining running memory usage of a current system from a resource management module by using a system identification module; determining, by using the system identification module, that the running memory usage is greater than the first threshold; sending the running memory usage to a keepalive decision module by using the system status identification module; in response to receiving the running memory usage, obtaining a system pressure coefficient by using the keepalive decision module by using the resource management module; determining, by using the keepalive decision module, whether the system pressure coefficient is greater than a fourth threshold; if the system pressure coefficient is greater than the fourth threshold, determining, by using the keepalive decision module, that a system status is a high-pressure state; in a case in which the system status is the high-pressure state, determining, by using the keepalive decision module, whether the running memory usage exceeds a fifth threshold; if the fifth threshold is exceeded, determining that the system pressure level is the first-level pressure; or if the fifth threshold is not exceeded, determining that the system pressure level is the second-level pressure.

With reference to the second aspect, in an implementation, the one or more processors are further configured to invoke the computer instruction so that the electronic device performs: obtaining the application type of the first application by using the keepalive decision module by using the application recognition module; and the determining an application type of a first application is specifically: determining, based on the application type, that the type of the first application is a video type by using the keepalive decision module.

With reference to the second aspect, in an implementation, the one or more processors are further configured to invoke the computer instruction so that the electronic device performs: obtaining a second interface switching report from an application switching identification module by using the keepalive decision module, where the second interface switching report includes at least a moment T2 at which the first application is switched to the background and identification information of the first interface; determining, by using the keepalive decision module, whether the identification information of the first interface is consistent with identification information of the first application home screen; if the two are consistent, determining, by using the keepalive decision module, that the first application is not in a video hold state; if the two are inconsistent, obtaining an audio focus change report of the first application from the audio focus recognition module by using the keepalive decision module, where the audio focus change report includes at least a moment T1 at which the first application requests the audio focus; calculating a modulus value of T1 and T2 by using the keepalive decision module; analyzing whether the modulus value is greater than or equal to first duration by using the keepalive decision module; if yes, determining, by using the keepalive module, that the first application is in a video hold state; or if no, determining, by using the keepalive module, that the first application is not in a video hold state.

With reference to the second aspect, in an implementation, the one or more processors are further configured to invoke the computer instruction so that the electronic device performs: in a case in which the system pressure level is the first-level pressure, determining, by using the keepalive decision module, whether the ranking of the first application in the first application queue falls within the second threshold, where the first application queue includes applications of the same type as the first application; if yes, determining, by using the keepalive decision module, that the first application meets the ranking condition; or, in a case in which the system pressure level is the second-level pressure, determining, by using the keepalive decision module, whether the ranking of the first application in the first application queue falls within the third threshold; and if yes, determining, by using the keepalive decision module, that the first application meets the ranking condition.

With reference to the second aspect, in an implementation, the one or more processors are further configured to invoke the computer instruction so that the electronic device performs: requesting an audio focus from an audio management module.

With reference to the second aspect, in an implementation, the one or more processors are further configured to invoke the computer instruction so that the electronic device performs: sending, by using the keepalive decision module, keepalive information of the first application to an audio focus decision module, where the keepalive information includes keepalive duration SaveTime.

With reference to the second aspect, in an implementation, the one or more processors are further configured to invoke the computer instruction so that the electronic device performs: sending a third interface switching report to an event management module by using an interface management module, where the third interface switching report includes identification information of the first application, identification information of a second application program, and an interface switching moment T4; sending the third interface switching report to the application switching identification module by using the event management module; determining, by using the application switching identification module, that the identification information of the first application is inconsistent with the identification information of the second application program; sending the third interface switching report to the audio focus decision module by using the application switching identification module; calculating a modulus value of T4 and a moment T5 at which the keepalive information is received by using the audio focus decision module; in a case in which the modulus value is greater than SaveTime, sending a first request message to the event management module by using the audio decision management module, where the first request message is used to instruct the audio management module to allocate the audio focus to the first application; the event management module sends the first request message to the audio management module; and the audio management module allocates the audio focus to the first application.

According to a third aspect, an embodiment of this application provides an electronic device, including a touch screen, a camera, one or more processors, and one or more memories. The one or more processors are coupled to the touch screen, the camera, and the one or more memories, the one or more memories are configured to store a computer program code, and the computer program code includes a computer instruction. When the one or more processors execute the computer instruction, the electronic device is enabled to perform the method according to any one of the first aspect or the implementations of the first aspect.

According to a fourth aspect, an embodiment of this application provides a chip system, where the chip system is applied to an electronic device, the chip system includes one or more processors, and the processor is configured to invoke a computer instruction so that the electronic device performs the method according to any one of the first aspect or the implementations of the first aspect.

According to a fifth aspect, an embodiment of this application provides a computer program product including an instruction. When the computer program product runs on an electronic device, the electronic device is enabled to perform the method according to any one of the first aspect or the implementations of the first aspect.

According to a sixth aspect, an embodiment of this application provides a computer-readable storage medium, including an instruction. When the instruction runs on an electronic device, the electronic device is enabled to perform the method according to any one of the first aspect or the implementations of the first aspect.

BRIEF DESCRIPTION OF DRAWINGS

FIG. 6A to FIG. 6C are a flowchart of determining that a video application is in a video hold state according to an embodiment of this application;

DESCRIPTION OF EMBODIMENTS

Figure 1A:
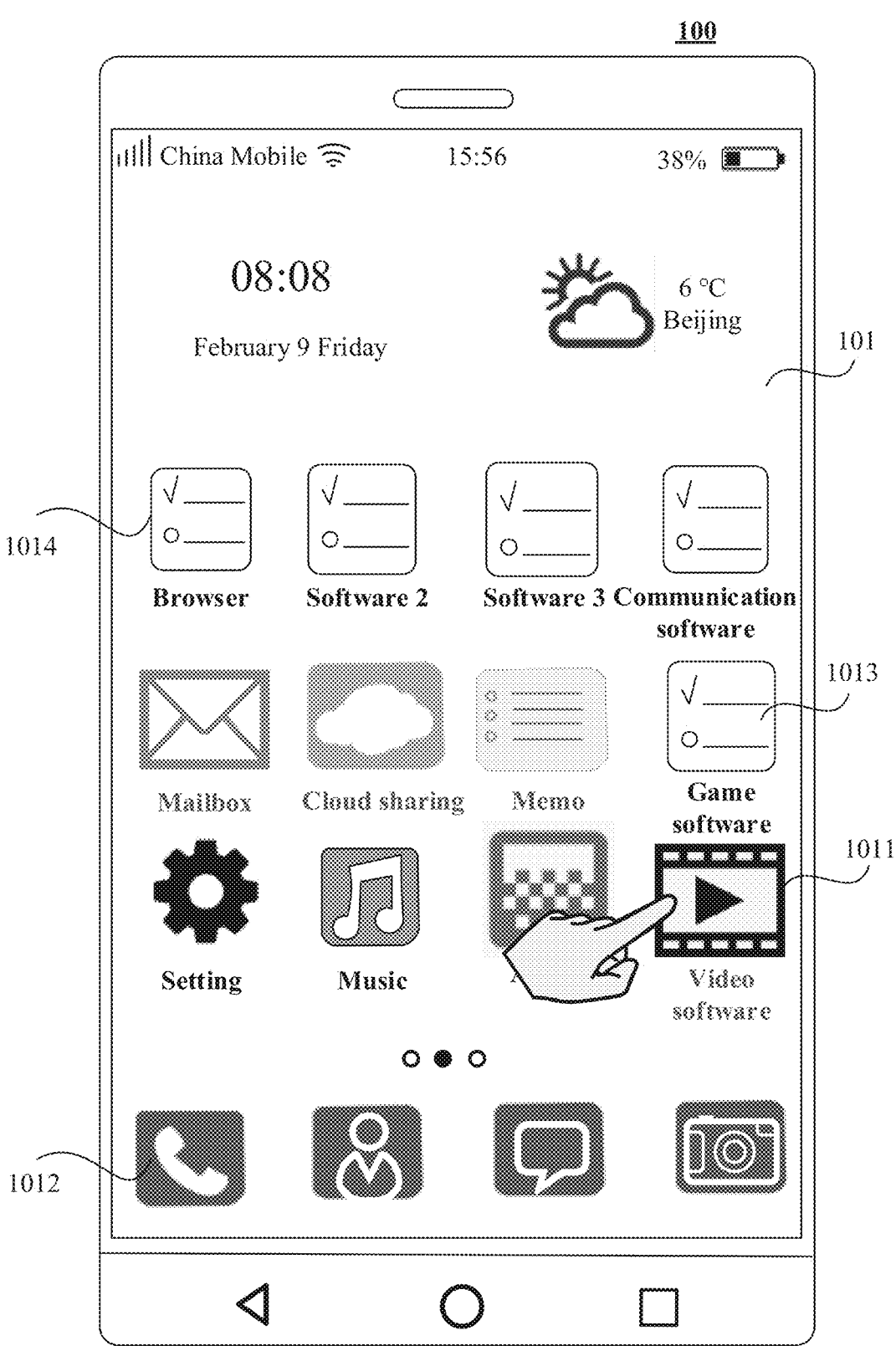
FIG. 1A to FIG. 1C are a diagram of an application scenario according to an embodiment of this application.

The following clearly and completely describes the technical solutions in the embodiments of this application with reference to the accompanying drawings in the embodiments of this application. Apparently, the described embodiments are only some of the embodiments of the present application, but not all of the embodiments. Referring to "embodiments" herein means that a specific feature, structure, or feature described with reference to the embodiments may be included in at least one embodiment of this embodiment. The phrases at all places in the specification are not necessarily referring to a same embodiment, or an independent or alternative embodiment mutually exclusive with another embodiment. A person skilled in the art may explicitly and implicitly understand that the embodiments described in this specification may be combined with another embodiment. Based on the embodiments of this application, all other embodiments obtained by a person of ordinary skill in the art without creative efforts fall within the protection scope of this application.

The terms "first", "second", "third" and the like in the specification and claims of this application and the accompanying drawings are used to distinguish different objects, and are not used to describe a specific sequence. In addition, the terms "include" and "have", and any variations thereof, are intended to cover non-exclusive inclusion. For example, a series of steps or units are included, or optionally, steps or units not listed are further included, or optionally other steps or units inherent in these processes, methods, products, or devices are further included.

The accompanying drawings show only some content related to this application but not all content. Before discussing example embodiments in more detail, it should be mentioned that some example embodiments are described as processes or methods depicted as flowcharts. Although the flowchart describes operations (or steps) as sequential processing, many of these operations may be implemented in parallel, concurrently, or simultaneously. In addition, sequence of operations may be rescheduled. The processing may be terminated when its operations are completed, but additional steps not included in the accompanying drawings may be included. The processing may correspond to a method, a function, a procedure, a subroutine, and the like.

The terms "component", "module", "system", "unit" and the like used in this specification are used to represent computer-related entities, hardware, firmware, a combination of hardware and software, software, or software in execution. For example, the unit may be but is not limited to a process running on a processor, a processor, an object, an executable file, an execution thread, a program, and/or distributed between two or more computers. In addition, these units may be executed by various computer-readable media on which various data structures are stored. For example, a unit may communicate through local and/or remote processes based on a signal with one or more data packets (for example, second unit data exchanged by another unit from a local system, a distributed system, and/or a network, for example, an Internet that interacts with another system by using a signal).

Figure 1B:
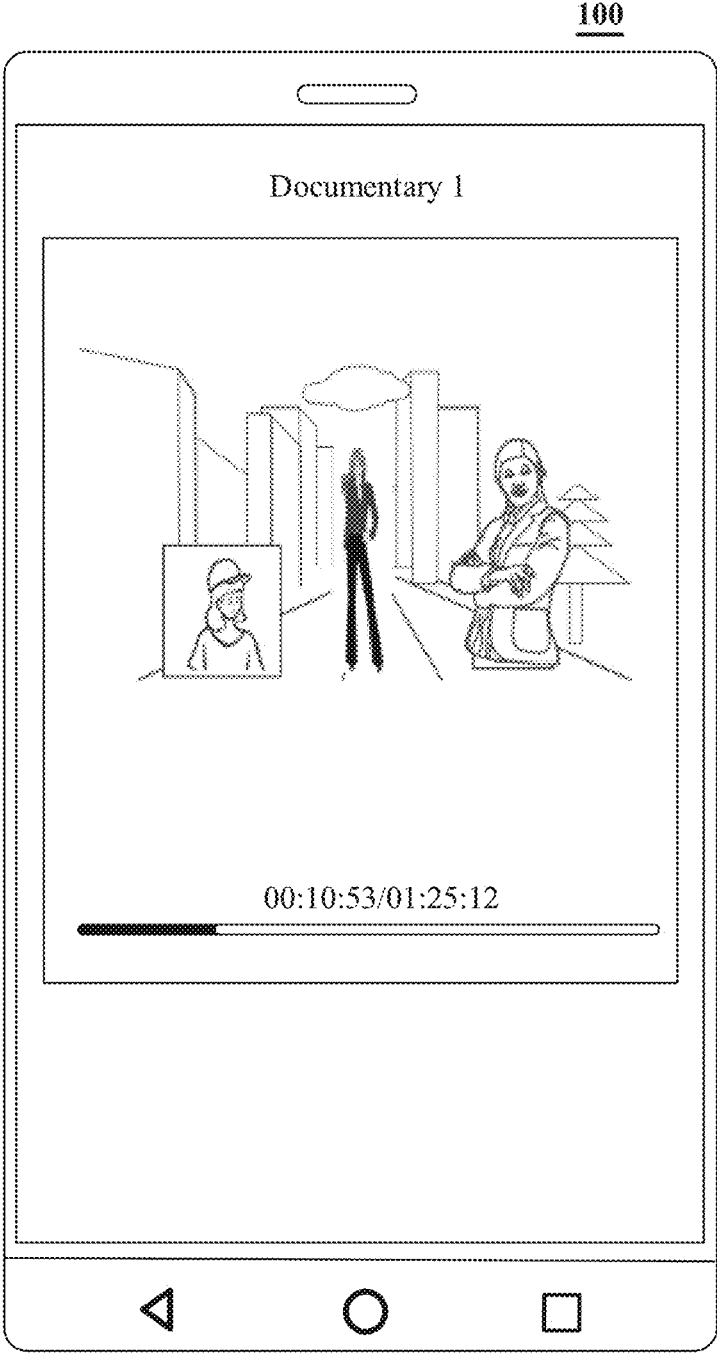
Figure 1C:
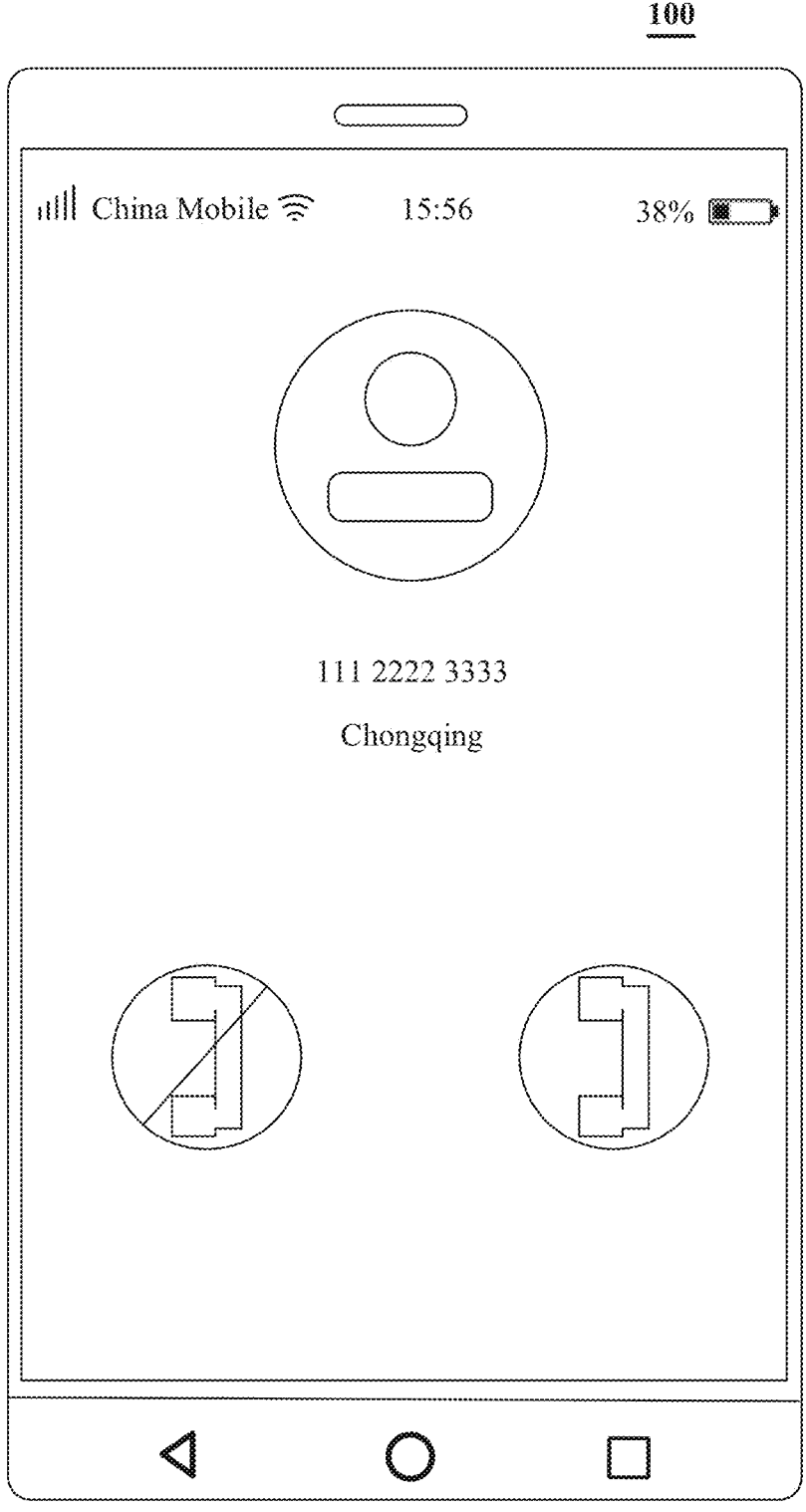

The following describes an application scenario provided in an embodiment of this application with reference to FIG. 1A to FIG. 1C.

As shown in FIG. 1A, there are a plurality of software icons, such as a video application 1011, a communication application 1012, a game application 1013, and a browser 1014, in a home screen 101 of an electronic device 100. When the electronic device 100 detects an input operation (for example, a tap) of a user for the video application 1011, the video application starts and enters an interface of the video application. In a process in which the user watches a documentary 1 shown in FIG. 1B by using the video application, if a friend calls the user, the electronic device 100 displays a call answering interface shown in FIG. 1C. When the user answers the call, the video application is switched to a background, and the electronic device 100 saves a currently watched video state.

When the user is on the call, if a running memory of a system is short, the system clears some applications running in the background and releases part of running memory space to ensure normal running of a call application running in a foreground currently. The electronic device first detects whether an application program running in the background is a keepalive application program. If the application program is a keepalive application program, the electronic device keeps the application program alive within a keepalive time. If the application program is not a keepalive application program, the electronic device clears a process of the application program. If application programs currently running in the background include the video application 1011, the game application 1013, and the browser 1014, and the system detects that the video application 1011 is a keepalive application program, and the game application 1013 and the browser 1014 are not keepalive application programs, the system may clear processes of the game application 1013 and the browser 1014, and keep the video application 1011 alive within the keepalive time (for example, 5 minutes).

When the video application 1011 is switched back to the foreground in five minutes, the video application 1011 directly displays an interface before the video application is switched, and the user does not need to re-perform steps such as searching for a video and testing last viewing progress, thereby saving time of the user to a specific extent. For example, in FIG. 1B, the documentary 1 is played, and a current playback progress is 00:10:53. After the video application 1011 is switched back to the foreground, the documentary 1 is still played on a playback interface, and a playback progress is 00:10:53.

Figure 2:
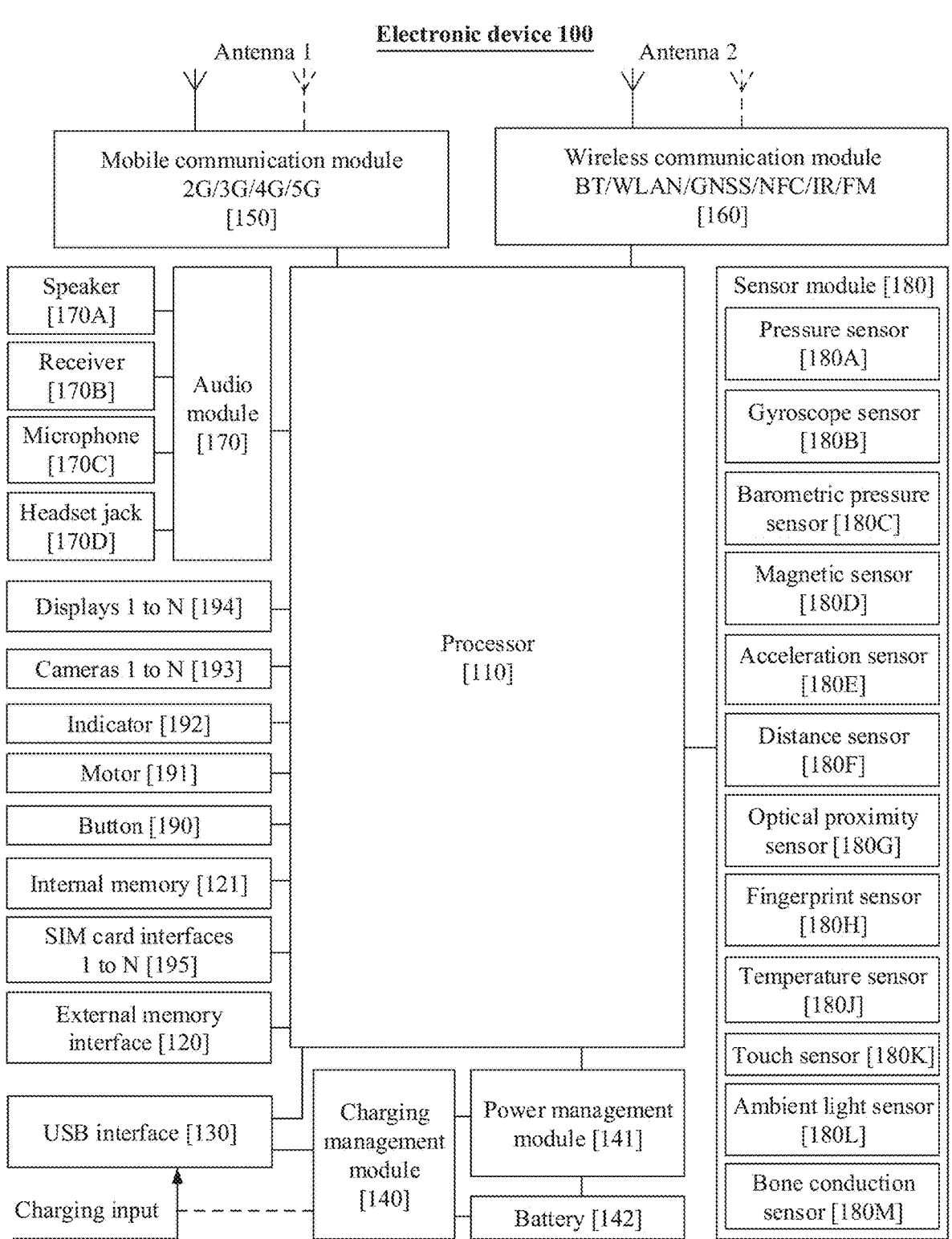
FIG. 2 is a schematic diagram of a hardware structure of an electronic device 100 according to an embodiment of this application.

The following describes a hardware structure of the electronic device 100. FIG. 2 is a schematic diagram of a hardware structure of the electronic device 100 according to an embodiment of this application. The electronic device 100 may be a mobile phone, a tablet computer, a remote control, or a wearable electronic device (such as a smart watch or augmented reality (AR) glasses) that has a wireless communication function.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset interface 170D, a sensor module 180, a button 190, a motor 191, an indicator 192, a camera 193, a display 194, and a subscriber identification module (SIM) card interface 195. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in this embodiment of the present disclosure does not constitute a specific limitation on the electronic device 100. In some other embodiments of this application, the electronic device 100 may include more or fewer components than those shown in the figure, or some components may be combined, or some components may be split, or components are arranged in different manners. The illustrated components may be implemented by hardware, software, or a combination of software and hardware.

The processor 110 may include one or more processing units. For example, the processor 110 may include an application processor (AP), a modulation and demodulation processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a neural center and a command center of the electronic device 100. The controller may generate an operation control signal based on an instruction operation code and a time sequence signal, to control instruction reading and instruction execution.

A memory may be disposed in the processor 110, and is configured to store an instruction and data. In some embodiments, the memory in the processor 110 is a cache memory. The memory may store an instruction or data that has just been used or is cyclically used by the processor 110. If the processor 110 needs to use the instruction or the data again, the instruction or the data may be directly invoked from the memory. Therefore, repeated access is avoided, a waiting time of the processor 110 is reduced, and system efficiency is improved.

In some embodiments, the processor 110 may include one or more interfaces. The interface may include an inter-integrated circuit (I2C) interface, an inter-integrated circuit sound (12S) interface, a pulse code modulation (PCM) interface, a universal asynchronous receiver/transmitter (UART) interface, a mobile industry processor interface (MIPI) interface, a general-purpose input/output (GPIO) interface, a subscriber identity module (SIM) interface, and/or a universal serial bus (USB) interface, and the like.

The electronic device 100 implements a display function by using the GPU, the display 194, the application processor, and the like. The GPU is a microprocessor for image processing, and is connected to the display 194 and the application processor. The GPU is configured to perform mathematical and geometric calculation and is configured to perform graphics rendering. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flex light-emitting diode (FLED), a Miniled, a MicroLed, a Micro-oLed, a quantum dot light emitting diode (QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, a ray of light is transmitted to a light-sensitive element of the camera through a lens, an optical signal is converted into an electrical signal, and the light-sensitive element of the camera transmits the electrical signal to the ISP for processing, so as to convert the electrical signal into an image visible to the naked eyes. The ISP may further perform algorithm optimization on noise, luminance, and complexion of an image. The ISP may further optimize parameters such as exposure and color temperature of a photographing scene. In some embodiments, the ISP may be disposed on the camera 193.

The digital signal processor is configured to process a digital signal. In addition to processing the digital image signal, the digital signal processor may also process another digital signal. For example, when the electronic device 100 selects a frequency point, the digital signal processor is configured to perform Fourier transform or the like on the frequency point energy.

The video codec is configured to compress or decompress a digital video. The electronic device 100 may support one or more video codecs. In this way, the electronic device 100 may play or record videos in a plurality of coding formats, for example, moving picture experts group (MPEG) 1, MPEG 2, MPEG 3, and MPEG 4.

The NPU is a neural-network (NN) computing processor that processes input information rapidly by referring to a structure of a biological neural network, for example, by referring to a transmission mode between human brain neurons, and can further perform self-learning continuously. The NPU may be used to implement an application such as intelligent cognition of the electronic device 100, for example, image recognition, facial recognition, voice recognition, and text understanding.

The electronic device 100 may implement audio functions by using the audio module 170, the speaker 170A, the receiver 170B, the microphone 170C, the headsetjack 170D, the application processor, and the like. The audio functions are, for example, music playback and recording.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed on the processor 110, or a part of functional modules of the audio module 170 may be disposed on the processor 110.

The speaker 170A, also referred to as a "loudspeaker", is configured to convert an audio electrical signal into a sound signal. The electronic device 100 may be used to listen to music or listen to a hands-free call through the speaker 170A.

The pressure sensor 180A is configured to sense a pressure signal, and may convert the pressure signal into an electrical signal. In some embodiments, the pressure sensor 180A may be disposed on the display 194.

The magnetic sensor 180D includes a Hall effect sensor. The electronic device 100 may detect opening and closing of a flip cover by using the magnetic sensor 180D.

The acceleration sensor 180E may detect acceleration of the electronic device 100 in all directions (generally three axes). When the electronic device 100 is still, magnitude and a direction of gravity may be detected. The acceleration sensor 180E may be further configured to identify an electronic device posture, and is applied to applications such as horizontal and vertical screen switching and a pacemaker.

The optical proximity sensor 180G may include, for example, a light emitting diode (LED) and a photodetector, for example, a photodiode. The light emitting diode may be an infrared light emitting diode. The electronic device 100 emits infrared light by using the light emitting diode. The electronic device 100 detects infrared reflected light from a nearby object by using the photodiode, so as to automatically turn off a screen to save power. The proximity light sensor 180G may also be used in a sheath mode, and the pocket mode is automatically unlocked and locked.

The ambient light sensor 180L is configured to sense ambient light brightness. The electronic device 100 may adaptively adjust brightness of the display 194 based on the perceived ambient brightness. The ambient light sensor 180L may also be configured to automatically adjust a white balance when photographing. The ambient light sensor 180L may further cooperate with the optical proximity sensor 180G to detect whether the electronic device 100 is in the pocket to prevent a false touch.

The fingerprint sensor 180H is configured to collect a fingerprint. The electronic device 100 may implement fingerprint unlocking, accessing application lock, fingerprint photographing, and fingerprint receiving calls by using features of the collected fingerprint.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor to determine a touch event type. A visual output related to a touch operation may be provided by using the display 194. In some other embodiments, the touch sensor 180K may alternatively be disposed on a surface of the electronic device 100 at a position different from a position of the display 194.

Figure 3:
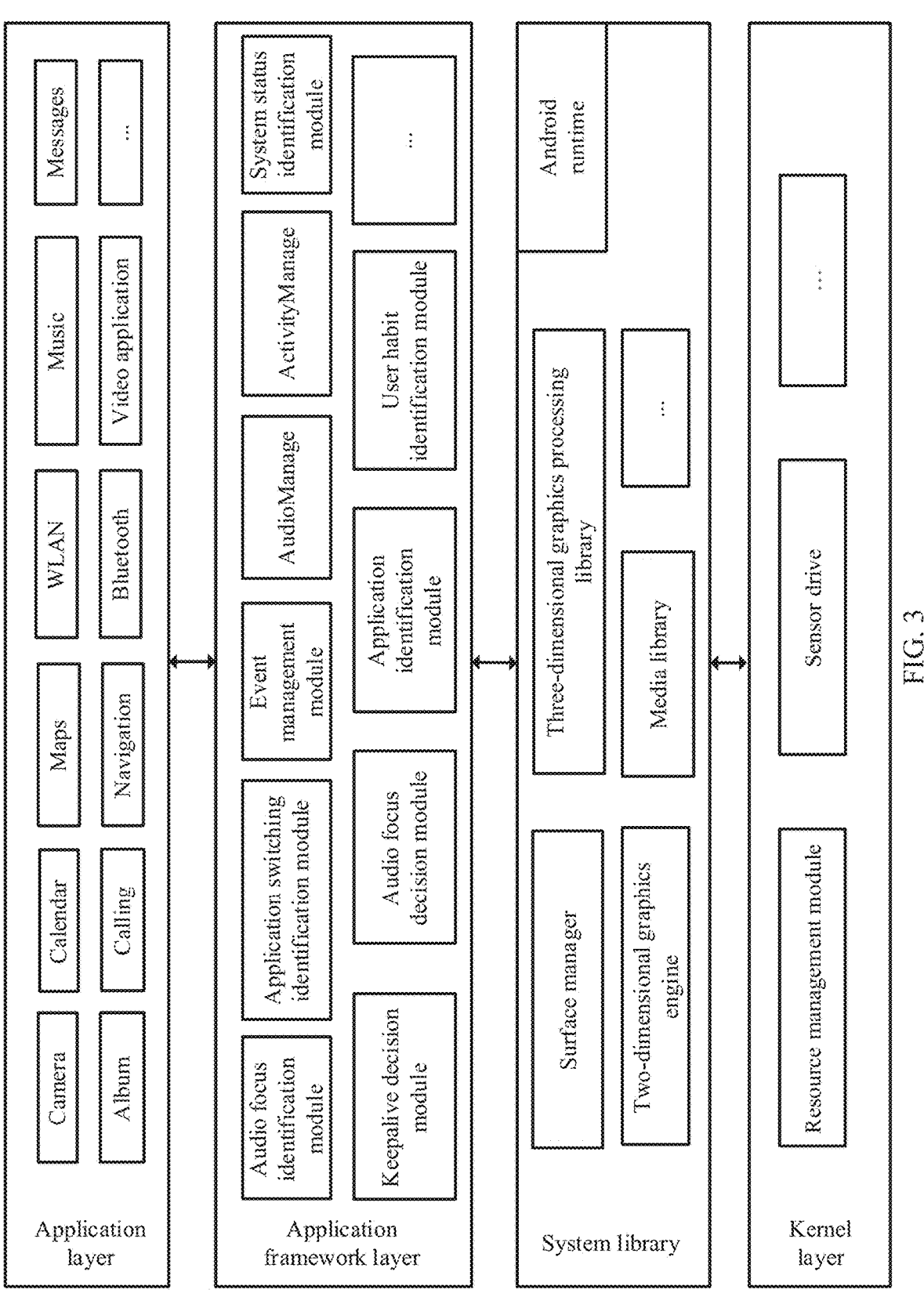
FIG. 3 is a block diagram of a software structure of an electronic device 100 according to an embodiment of this application.

A software system of the electronic device 100 may use a hierarchical architecture, an event-driven architecture, a micronucleus architecture, a microservice architecture, or a cloud architecture. In this embodiment of the present disclosure, an Android system with a hierarchical architecture is used as an example to describe a software structure of the electronic device 100. FIG. 3 is a block diagram of a software structure of the electronic device 100 according to an embodiment of this application. Layered architecture divides software into several layers and each layer has a clear role and division of labor. Layers communicate with each other by using software interfaces. In some embodiments, the Android system is divided into four layers: an application layer, an application framework layer, an Android runtime and a system library, and a kernel layer.

The application layer may include a series of application packages. As shown in FIG. 3, the application program package may include application programs such as Camera, Album, Calendar, Calling, Maps, Navigation, WLAN, Bluetooth, Music, Video, Messages, and the like.

The application framework layer provides an application programming interface (API) and a programming framework for application programs at the application layer. The application framework layer includes some predefined functions. As shown in FIG. 3, the application framework layer may include an audio focus recognition module, an application switching recognition module, an event management module, an AudioManager (audio management module), an ActivityManager (interface management module), a keepalive decision module, an audio focus decision module, an application recognition module, a user habit recognition module, a system status identification module, and the like.

The audio focus recognition module is configured to identify whether an application program requests an audio focus.

The application switching identification module is configured to identify whether an application program/interface is switched. The switching is divided into cut-in and cut-out. The cut-in is that an application program running in a background is switched to a foreground, and the cut-out is that an application program running in the foreground is switched to the background.

The event management module is used for communication between a working module such as the audio focus recognition module, the application switching module, the keepalive decision module and the ActivityManager, the AudioManager.

The AudioManager is configured to allocate/undo an audio focus of an application program.

The ActivityManager is configured to query a running interface of an application program and identify interface switching.

The keepalive decision module is configured to analyze a keepalive application program in a system, and keep a process of the keepalive application program alive within a specified time period according to a keepalive policy.

The audio focus decision module is configured to manage an audio focus of an application program that is switched to a foreground or a background.

The application recognition module is configured to identify a type of an application program, for example, identify an application program as a social application program, a video application program, or a shopping application program. The user habit identification module is configured to analyze user behavior based on user data. For example, the user habit identification module is configured to divide application programs into high frequency application programs and low frequency application programs based on frequency of using an application program in a period of time and time of each use of the application program.

The system status identification module is configured to obtain current running memory usage of a system.

The Android runtime includes a core library and a virtual machine. The Android runtime is responsible for dispatching and management of the Android system.

The core library includes two parts: one is function functions that need to be called in java language, and the other is a core library of Android.

The application layer and the application framework layer run in the virtual machine. The virtual machine executes java files at the application layer and the application framework layer as binary files. The virtual machine is used to perform functions such as object lifecycle management, stack management, thread management, security and abnormality management, and garbage collection.

The system library may include a plurality of function modules. For example, a surface manager (Surface Manager), a media library (Media Libraries), a three-dimensional graphics processing library (for example, OpenGL ES), and a 2D graphics engine (for example, SGL).

The surface manager is used to manage a display subsystem and provide a fusion of 2D and 3D layers for a plurality of application programs.

The media library supports various commonly used audio, video format playback and recording, still image files, and the like. The media library may support a plurality of audio and video coding formats, such as: MPEG4, H.264, MP3, AAC, AMR, JPG, PNG, and the like.

The three-dimensional graphics processing library is used to implement three-dimensional graphics drawing, image rendering, composition, layer processing, and the like.

The 2D graphics engine is a drawing engine of the 2D drawing.

The kernel layer is a layer between hardware and software. The kernel layer includes at least a display driver, a camera driver, an audio driver, a resource management module, and a sensor driver.

The resource management module is configured to store a data resource generated by a running memory of a system.

The foregoing embodiments of FIG. 1A to FIG. 1C describe an application scenario in which a system keeps a video application alive. The system divides the applications running in the background into keepalive applications and non-keepalive applications. When the running memory of the system is short, the system clears processes of the non-keepalive applications and keeps processes of the keepalive applications alive within keepalive duration. When the keepalive duration expires and the keepalive application is not switched to the foreground, the system does not keep the application alive.

When the running memory of the system is short, a process of the video application running in the background is often cleared. Therefore, when the user wants to continue to use the video application to watch a video, a tedious operation such as opening a video application, searching for a target video, watching an advertisement, and searching for a progress needs to be performed again, which brings great time costs and extremely poor use experience to the user.

Figure 4A:
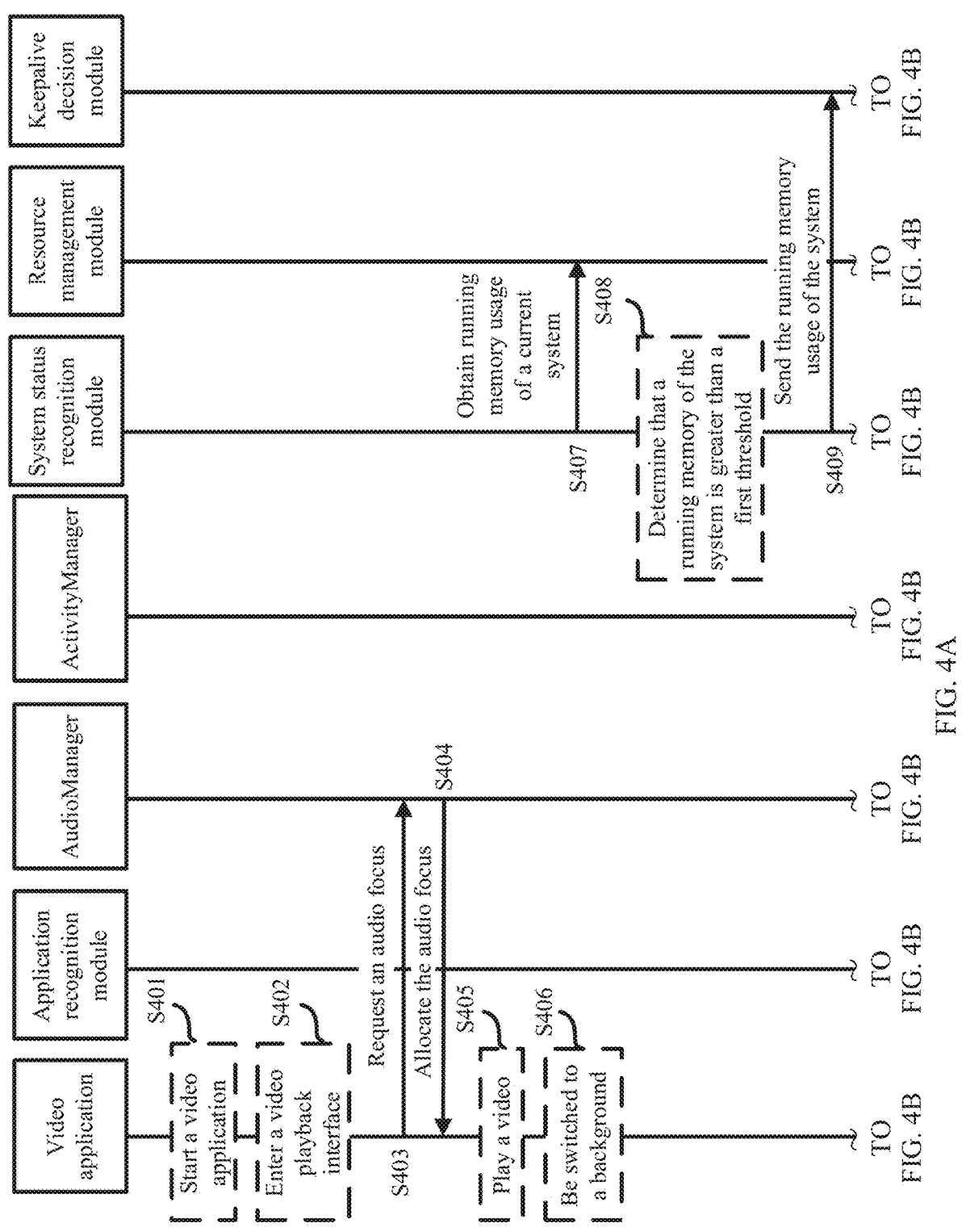
FIG. 4A to FIG. 4C are a flowchart of a keepalive video application process according to an embodiment of this application.
Figure 4B:
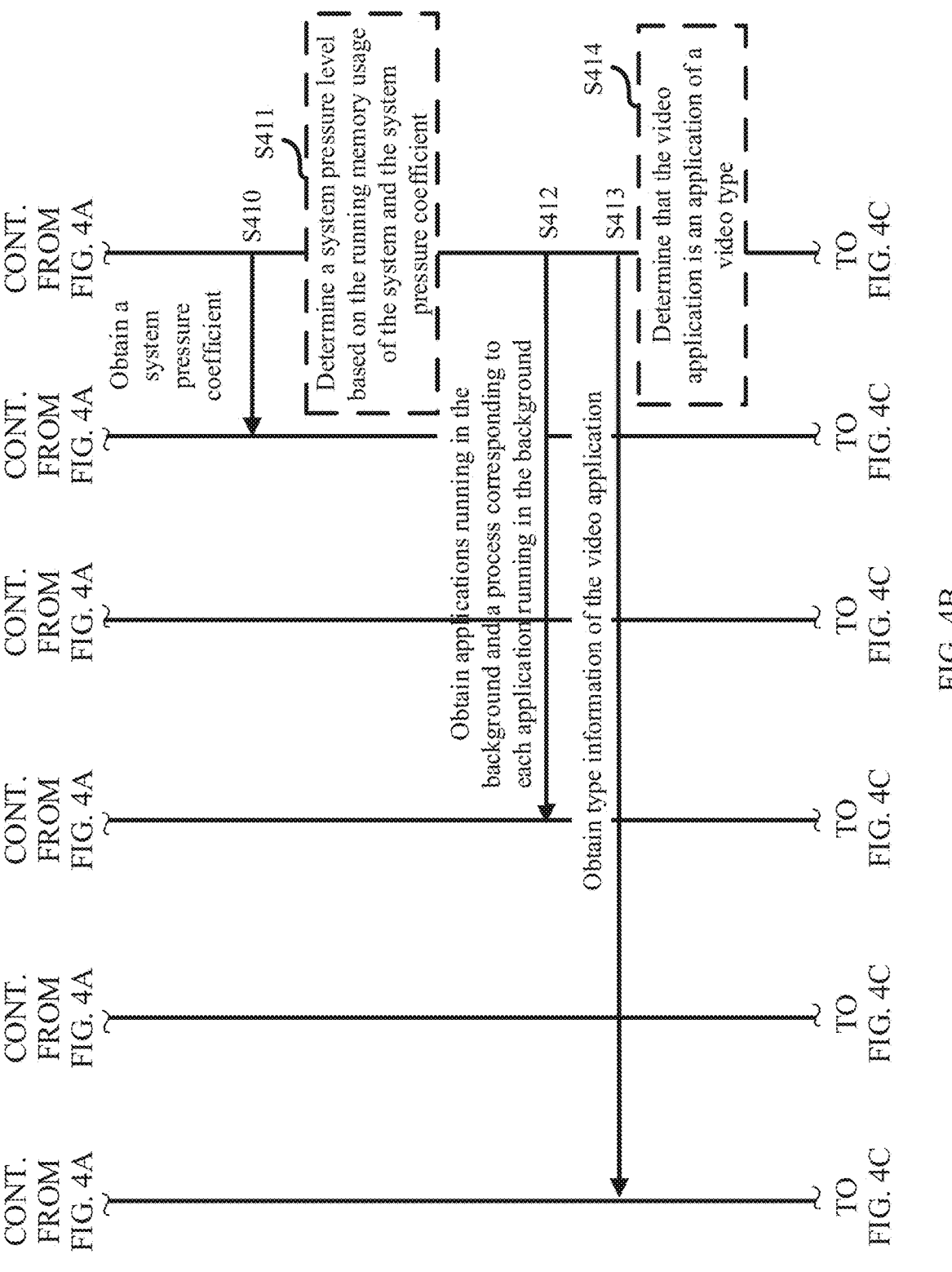
Figure 4C:
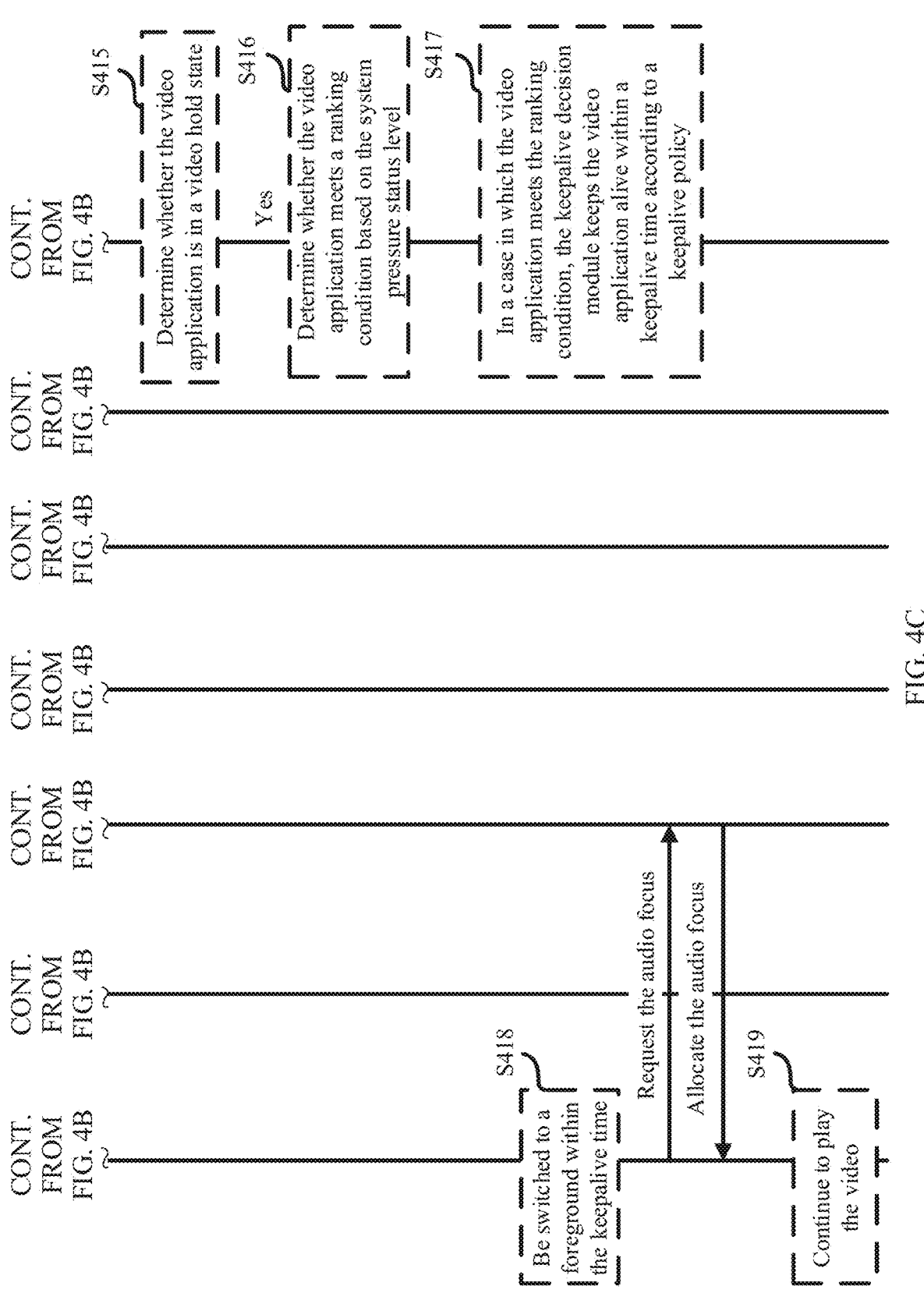

To solve the foregoing problem, an embodiment of this application provides a video application keepalive method. When a running memory of an electronic device system is short and a video application running in a background is a keepalive application program, the electronic device keeps the video application alive according to a keepalive policy. An example in which a first application is a video application is used in this embodiment of this application. With reference to FIG. 4A to FIG. 4C, the following describes a procedure of keeping a process of the video application alive in a system. FIG. 4A to FIG. 4C are a flowchart of keeping a process of a video application alive in a system according to an embodiment of this application. A specific procedure is as follows:

Step S401: Start a video application.

Figure 5A:
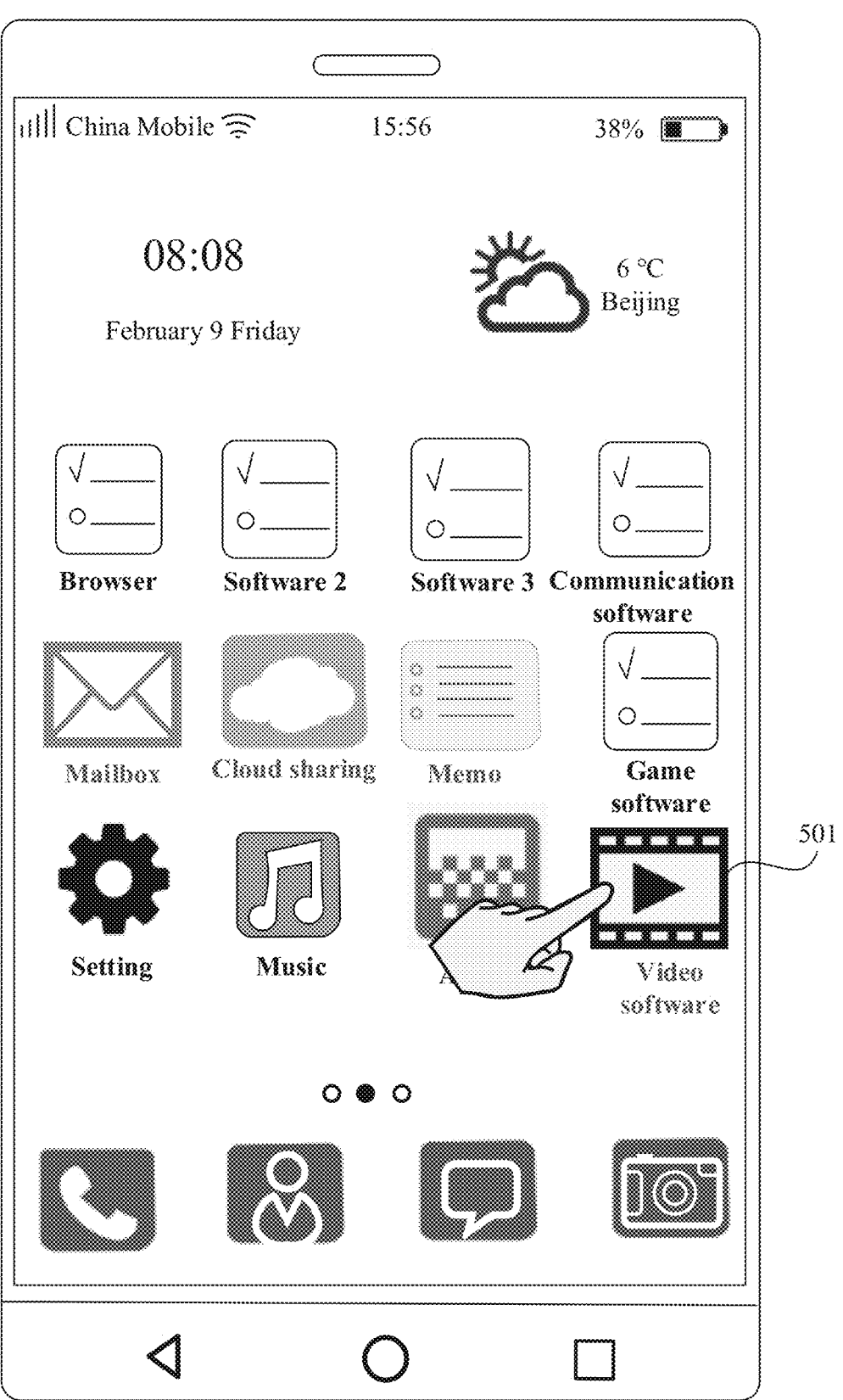
FIG. 5A to FIG. 5E are diagrams of interfaces of a video application according to an embodiment of this application.
Figure 5B:
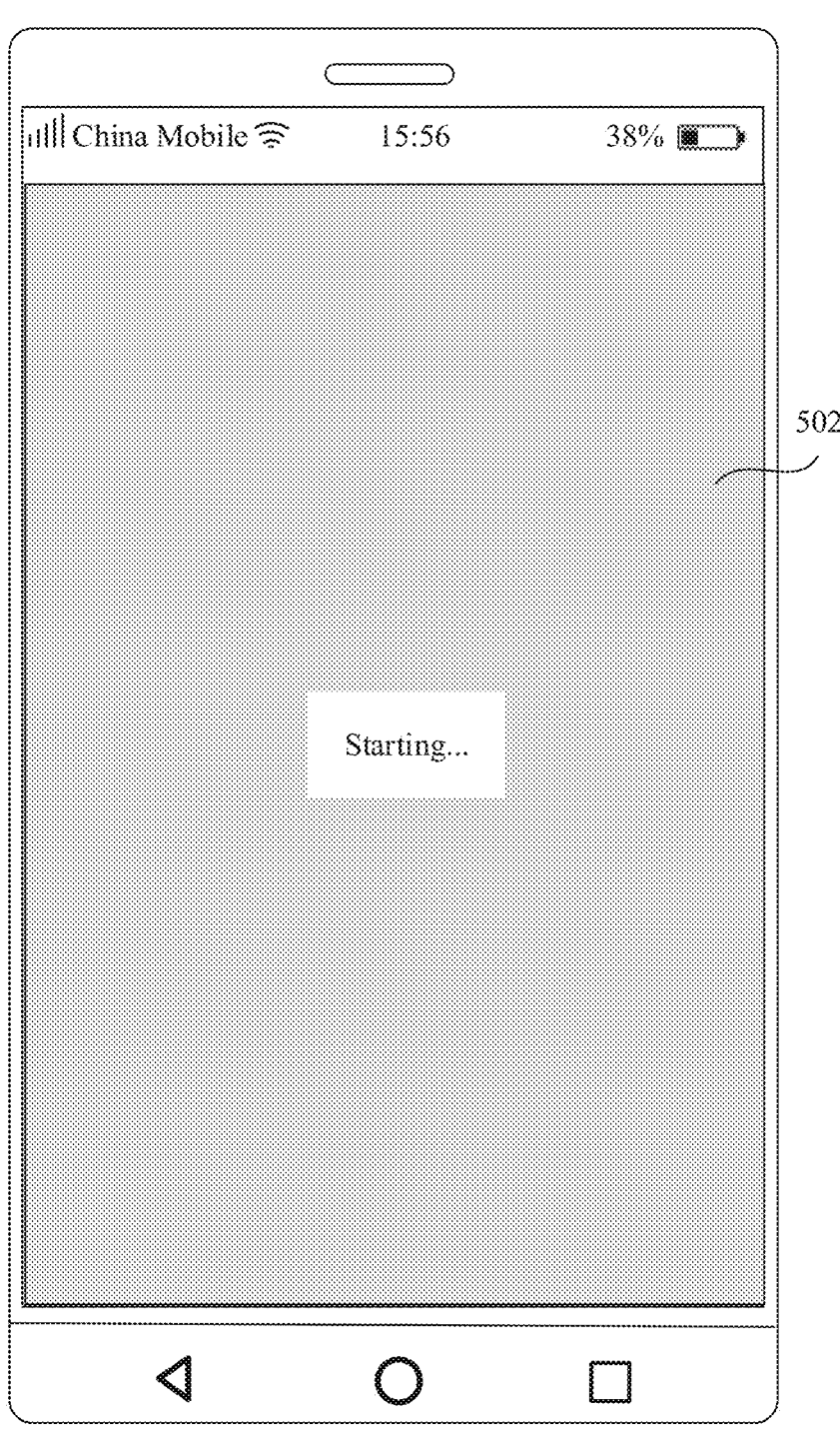
Figure 5C:
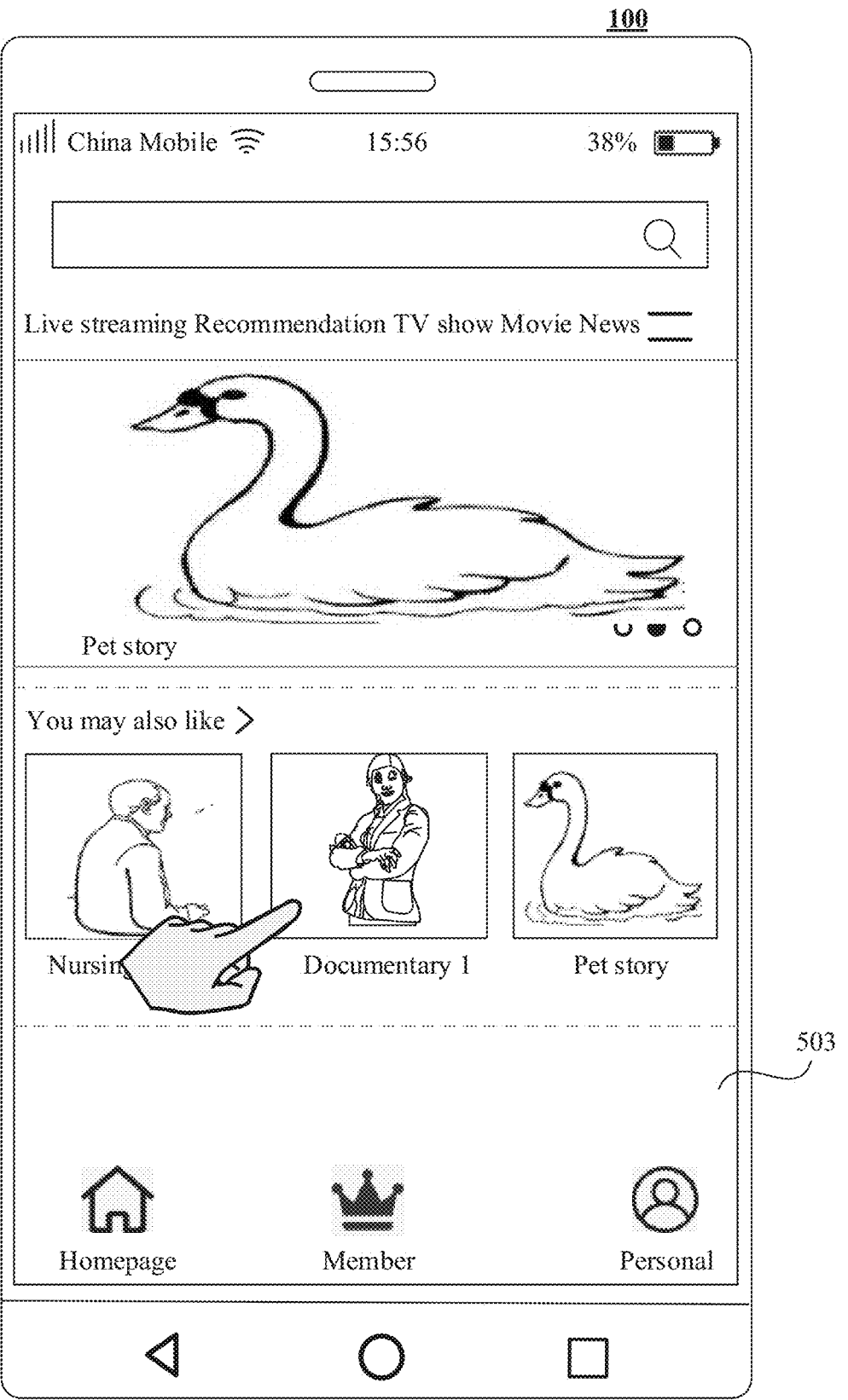

For example, as shown in FIG. 5A, after an electronic device 100 detects an input operation (for example, a tap) for an icon 501 of the video application, a video application loading interface 502 shown in FIG. 5B is displayed. In a process of displaying the application loading interface 502, the electronic device starts a related process of the video application. After the video application is started, a home screen 503 of the video application shown in FIG. 5C is entered.

Step S402: Enter a video playback interface.

Figure 5D:
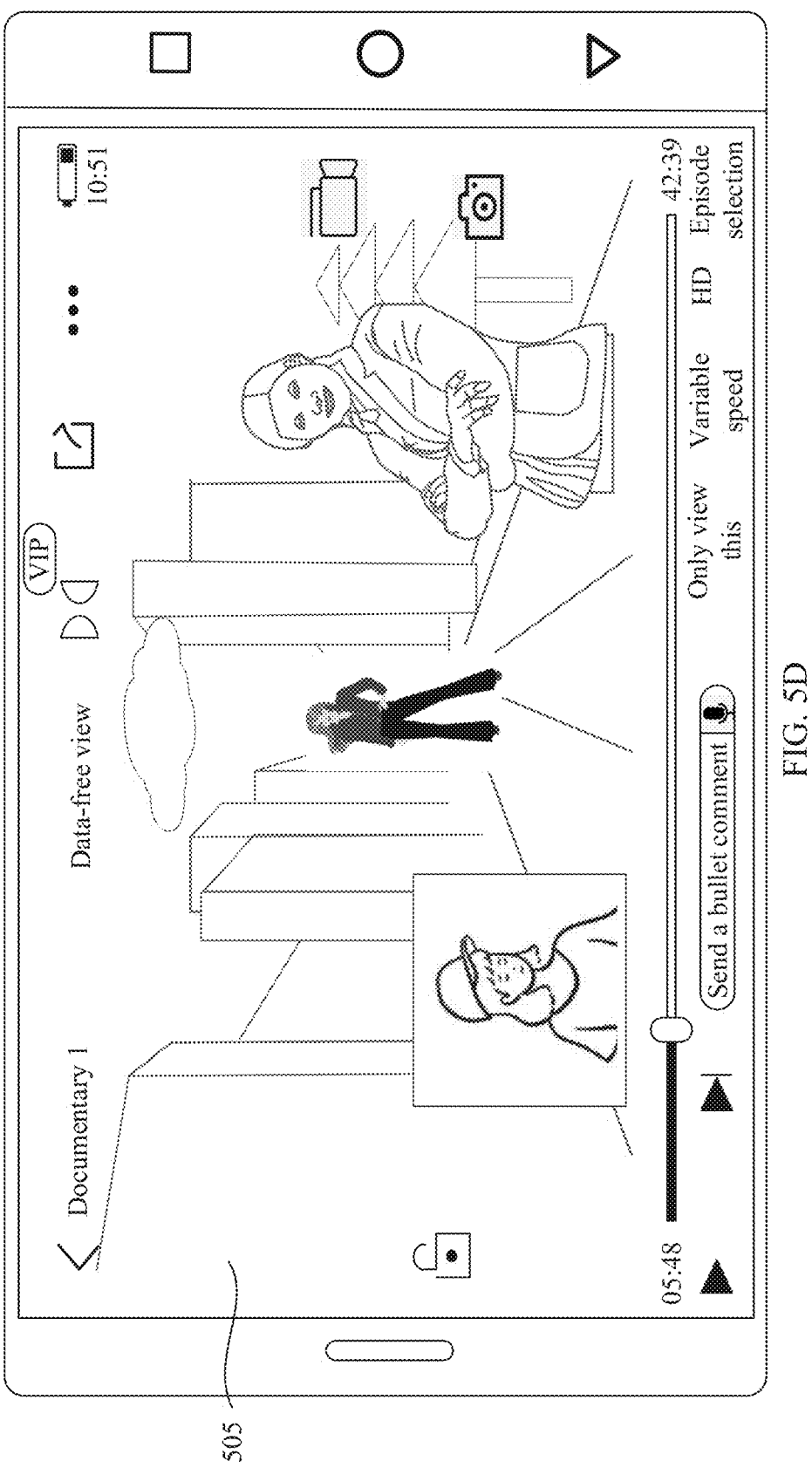

Specifically, the video playback interface is a working interface for the video application to play a video. For example, after a user taps a video (for example, a documentary 1) from the home screen of the video application in FIG. 5C, the video application displays a video playback interface 505 shown in FIG. 5D. As shown in FIG. 5D, the video (the documentary 1) selected by the user is played in the video playback interface.

Step S403: The video application requests an audio focus from an AudioManager.

Specifically, when entering the video playback interface, the video application requests an audio focus from the AudioManager, so that the video application plays audio of the video resource. For example, the video application may invoke a function AudioFocus_Request ( ) to request an audio focus from the AudioManager.

Step S404: The AudioManager allocates the audio focus to the video application.

Specifically, after receiving the request for requesting the audio focus by the video application, the AudioManager allocates the audio focus to the video application, and returns a constant GRANTED to the video application by using a function AudioFocus_Request, where the constant is used to represent that the video application successfully requests the audio focus.

Step S405: The video application plays a video.

Specifically, after the audio focus is successfully requested, the video application plays the video on the video playback interface. In this case, the user may see a playback picture of the video application and hear corresponding audio content.

Step S406: The video application is switched to a background.

Specifically, the user may actively switch the video application to the background, or may start another application to run at a foreground, so that the video application is switched to the background. For example, the user receives an incoming call in a video watching process, and the video application is switched to run in the background. After the video application is switched to the background, the video application may release the audio focus, or may not release the audio focus. This is not limited in this embodiment of this application.

Step S407: A system status identification module obtains running memory usage of a current system from a resource management module.

Specifically, after the electronic device is powered on, the system status identification module periodically monitors a current running status of the system. A specific manner of monitoring is as follows: The system status identification module periodically invokes a function Memory Request to obtain the running memory usage of the system from the resource management module located at a kernel layer. For example, the running memory usage of the system is 5G.

Step S408: The system status identification module determines that the running memory usage of the system is greater than a first threshold.

For example, the system status identification module determines whether the running memory usage of the system exceeds the first threshold. If the running memory usage of the system exceeds the first threshold, the system status identification module sends the running memory usage of the system to a keepalive decision module, and performs step S409. Otherwise, the system status identification module does not send the running memory usage of the system. For example, a preset threshold is 3G, and the running memory usage of the system is 5G. Because the running memory usage of the system exceeds the preset threshold, the system status identification module needs to send the running memory usage of the system to the keepalive decision module.

Step S409: The system status identification module sends the running memory usage of the system to the keepalive decision module.

Specifically, the system status identification module may invoke a function Memory_Send to send the running memory usage of the system to the keepalive decision module.

Step S410: The keepalive decision module obtains a system pressure coefficient from the resource management module.

Specifically, after the keepalive decision module receives the system running memory usage sent by the system status identification module, the keepalive decision module may obtain the system pressure coefficient from the resource management module. The system pressure coefficient may include an input/output (IO) pressure coefficient (for example, 90), a central processing unit (CPU) pressure coefficient (for example, 90), and a memory pressure coefficient (for example, 80). For example, the keepalive decision module may obtain the system pressure coefficient from the resource management module located at the kernel layer by invoking a function Pressure Request.

Step S411: The keepalive decision module determines a system pressure level based on the running memory usage of the system and the system pressure coefficient.

Specifically, the keepalive decision module determines whether the system pressure coefficient reaches a fourth threshold. If the system pressure coefficient is greater than the fourth threshold, the system is in a high-pressure state; otherwise, the system is in a low-pressure state. The fourth threshold may be obtained based on experience, or may be obtained based on historical data, or may be obtained based on experimental data. This is not limited in this embodiment of this application.

If the system is in a high-pressure state, it is determined that the system pressure is high. Some or all applications running in the background need to be cleared. If the system is in a low-pressure state, it is determined that the system pressure is low, and the applications running in the background do not need to be cleared.

If the system is in a high-pressure state, it is determined whether the running memory usage of the system exceeds a fifth threshold. If the running memory usage of the system exceeds the fifth threshold, it is determined that the system pressure level is a first-level pressure; otherwise, the system pressure level is a second-level pressure. In actual application, a plurality of pressure state levels may be classified based on a specific case. The fifth threshold may be obtained from historical experience, may be obtained from historical data, or may be obtained from experimental data. This is not limited in this embodiment of this application.

Step S412: When the system is in a high-pressure state, the keepalive decision module obtains, from an Activity-manager, applications currently running in the background and a process corresponding to each application running in the background.

Specifically, the keepalive decision module obtains an application queue from the Activitymanager. The application queue includes all applications running in the background, and each application is corresponding to one process queue. For example, the keepalive decision module obtains, from the resource management module, ten applications running in the background. The keepalive decision module may determine, based on a current pressure level of the system, which applications to be cleared. The keepalive decision module may obtain, from the Activitymanager by invoking a function Process_Request, the applications running in the background and the process corresponding to each application running in the background.

Step S413: The keepalive decision module obtains a type of the video application from an application recognition module.

Specifically, the keepalive decision module may obtain type information of the video application by using a function Request_Type(App_1). App_1 is a packet name of the video application. A correspondence table between an application package name and an application type may be preset in the application recognition module, and an application type corresponding to the application may be queried by using the correspondence table. The application recognition module queries type information Video of the video application in the correspondence table based on the packet name App_1 of the video application, and invokes a function Type_Call-Back to return the type information to the keepalive decision module. The Video is used to indicate that a type of the application is a video type.

Step S414: The keepalive decision module determines that the video application is an application of a video type.

Step S415: The keepalive decision module determines whether the video application is in a video hold state.

Specifically, if it is determined that the video application is in a video hold state, step S416 is performed. If it is determined that the video application is not in a video hold state, the video application does not need to be kept alive, and the video application may be set in a non-keepalive queue.

Step S416: In a case in which it is determined that the video application is in a video hold state, the keepalive decision module determines, based on the system pressure level, whether the video application meets a ranking condition.

Specifically, the ranking condition may be whether a ranking of the video application in first applications reaches a preset ranking range. The first application is an application of a video type in the electronic device. For example, the keepalive decision module reads parameters such as use frequency f of the first application, a time t1 for each use, and duration for which the application is switched to the background this time from a user habit identification module, calculates a score value of each application based on these parameters, and ranks the applications based on the score value.

The keepalive decision module determines a preset ranking range based on the pressure status level. When the system pressure level is the first-level pressure, the preset ranking range is a second threshold, that is, when the ranking of the video application falls within the second threshold (including the second threshold), the ranking condition is met, and step S417 is performed. When the ranking of the video application does not fall within the second threshold (including the second threshold), the ranking condition is not met, and the video application may be set in the non-keepalive queue. When the system pressure status level is the second-level pressure state, the preset ranking range is a third threshold, that is, when the ranking of the video application falls within the third threshold (including the third threshold), the ranking condition is met, and step S417 is performed. When the ranking of the video application does not fall within the third threshold (including the third threshold), the ranking condition is not met, and it is not necessary to keep the video application alive, and the video application may be set in the non-keepalive queue.

Step S417: In a case in which the video application meets the ranking condition, the keepalive decision module keeps the video application alive within a keepalive time according to a keepalive policy.

Specifically, if the ranking of the video application in the first application programs reaches the preset ranking range, the video application is a keepalive application program, and the keepalive decision module keeps the video application alive according to the keepalive policy. The keepalive policy is that the keepalive decision module has different keepalive durations for the video application based on different system pressure status levels. For example, when the system is in a first-level pressure state, the keepalive decision module keeps the video application alive for three minutes. When the system is not in a first-level pressure state, the keepalive decision module keeps the video application alive for five minutes. When the system is in a first-level pressure state, if the video application is not switched to the foreground after 3 minutes, keeping the video application alive is cancelled, and the video application is set in the non-keepalive queue.

The keepalive decision module may group processes, and the processes may specifically be divided into a keepalive queue and a non-keepalive queue. If it is determined that it is necessary to keep the application alive, the application is placed in the keepalive queue. If it is not necessary to keep the application alive or a keepalive time expires, the application is placed in the non-keepalive queue. When memory clearing needs to be performed, application processes corresponding to applications in the non-keepalive queue may be cleared.

Step S418: The video application is switched to the foreground within the keepalive time.

Specifically, in step S406, if the video application releases the audio focus after being switched to the background, or another application requests the audio focus after the video application is switched to the background, in step S418, the video application requests the audio focus again. For a process of re-requesting the audio focus by the video application, refer to step S403 and step S404. Details are not described herein again in this embodiment of this application. If the video application does not release the audio focus after being switched to the background, the video application may not re-request the audio focus.

Step S419: The video application continues to play the video.

Figure 5E:
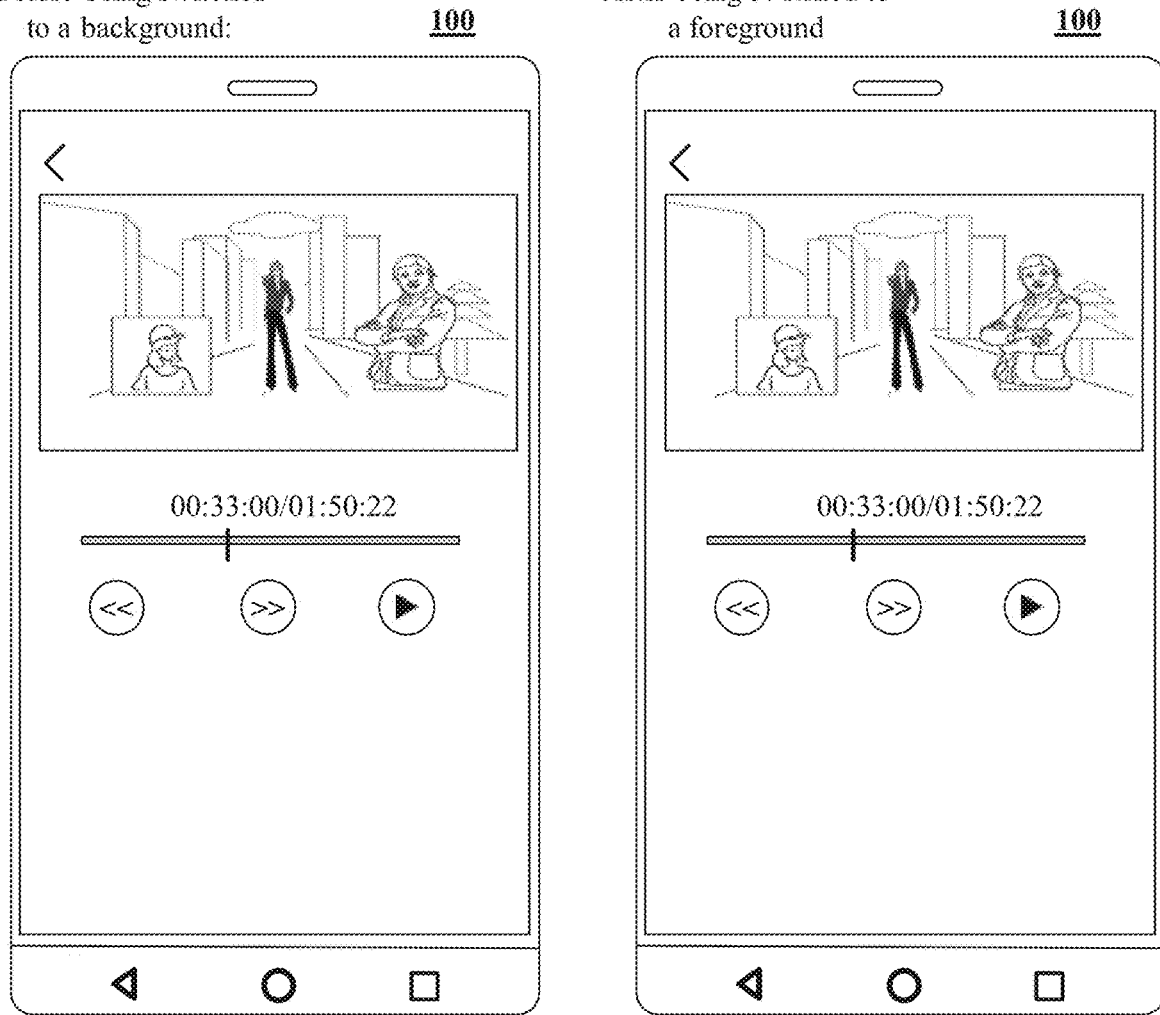

Specifically, after being switched to the foreground, the video application continues to play the video before the video application is switched to the background, and a video play progress is the same as a video play progress before the video application is switched to the background. For example, in FIG. 5E, before the video application is switched to the background, the documentary film 1 is played, and a playback progress is 00:33:00. After the video application switches to the foreground, the documentary film 1 is played, and a playback progress is 00:33:00.

In a possible implementation, the system status identification module may alternatively be in the keepalive decision module, that is, the keepalive decision module may be configured to perform a function of the system status identification module. Specifically, the keepalive decision module may periodically invoke the function Memory Request to read the running memory usage of the system from the resource management module at the kernel layer. Determining, based on the running memory usage of the system, whether the current system needs to clear the memory. If the system needs to be cleared, the system pressure coefficient is obtained by using the resource management module, and the keepalive decision module determines the system pressure level based on the running memory usage of the system and the system pressure coefficient.

For example, the keepalive decision module may alternatively obtain a usage rate of the system running memory and the system pressure coefficient at the same time, and determine the system pressure level based on the system running memory usage and the system pressure coefficient. For example, in a high-pressure state, it is determined whether the running memory usage of the system exceeds the second threshold. If the running memory usage of the system exceeds the second threshold, it is determined that the system status is a first-level pressure state; otherwise, the system status is a second-level pressure state. In actual application, a plurality of pressure state levels may be classified based on a specific case.

In a possible implementation, after the system status identification module obtains the running memory usage of the current system from the resource management module, the system status identification module may determine, based on whether the running memory usage exceeds the first threshold, whether the system needs to clear the memory. If the first threshold is exceeded, the memory needs to be cleared, and the system status identification module sends the running memory usage of the system to the keepalive decision module. Then, the keepalive decision module obtains the system pressure coefficient from the resource management module, and determines the system pressure level based on the system pressure coefficient. For example, the keepalive decision module determines whether the system pressure coefficients all reach a preset upper limit value. If the system pressure coefficients all exceed the upper limit value, it is determined that the system pressure level is the first-level pressure; otherwise, the system pressure level is the second-level pressure. Then, the keepalive decision module obtains, from the Activitymanager, applications currently running in the background and process corresponding to each application running in the background.

In a possible implementation, after step 409 is performed, step 412 may be directly performed. The keepalive decision module obtains, from the Activitymanager, applications running in the background and processes corresponding to the applications running in the background. That is, after the system status identification module sends the running memory usage of the system to the keepalive decision module, the keepalive decision module obtains, from the Activitymanager, applications currently running in the background and process corresponding to each application running in the background. Then, the keepalive decision module obtains the type of the video application from the application recognition module, and after determining that the video application is an application of a video type, determines whether the video application is in a video hold state. In a case in which it is determined that the video application is in a video hold state, the keepalive decision module obtains the system pressure coefficient from the resource management module, and determines the system pressure level based on the system pressure coefficient. Then, the keepalive decision module determines, based on the system pressure level, whether the video application meets the ranking condition.

In this embodiment of this application, when the system running memory is in a high-pressure state, it is determined whether the video application is a keepalive application program. In a case in which the video application is a keepalive application program, the video application is kept alive according to the keepalive policy, and in a case in which the system can run normally, it is ensured that a process of the video application can continue to run in the background. When the user re-switches the video application to the foreground within the keepalive duration, the video application is in a video playback state before being switched, and a progress of the video is the same as a progress before the video application is switched. The user does not need to perform tedious operations such as starting the video application, searching for a video, and searching for historical viewing progress. This saves the user time and gives the user good experience.

Figure 6A:
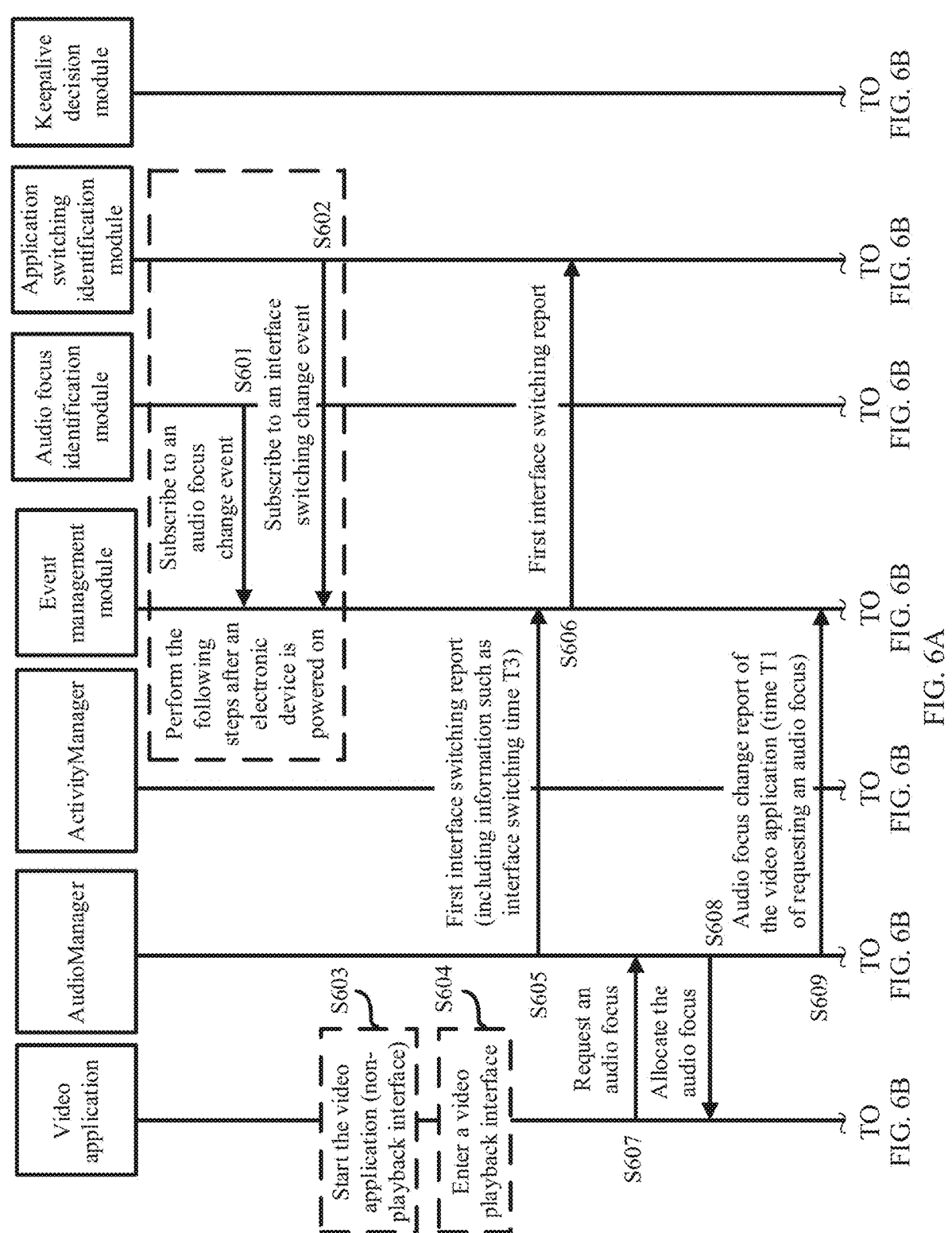
Figure 6B:
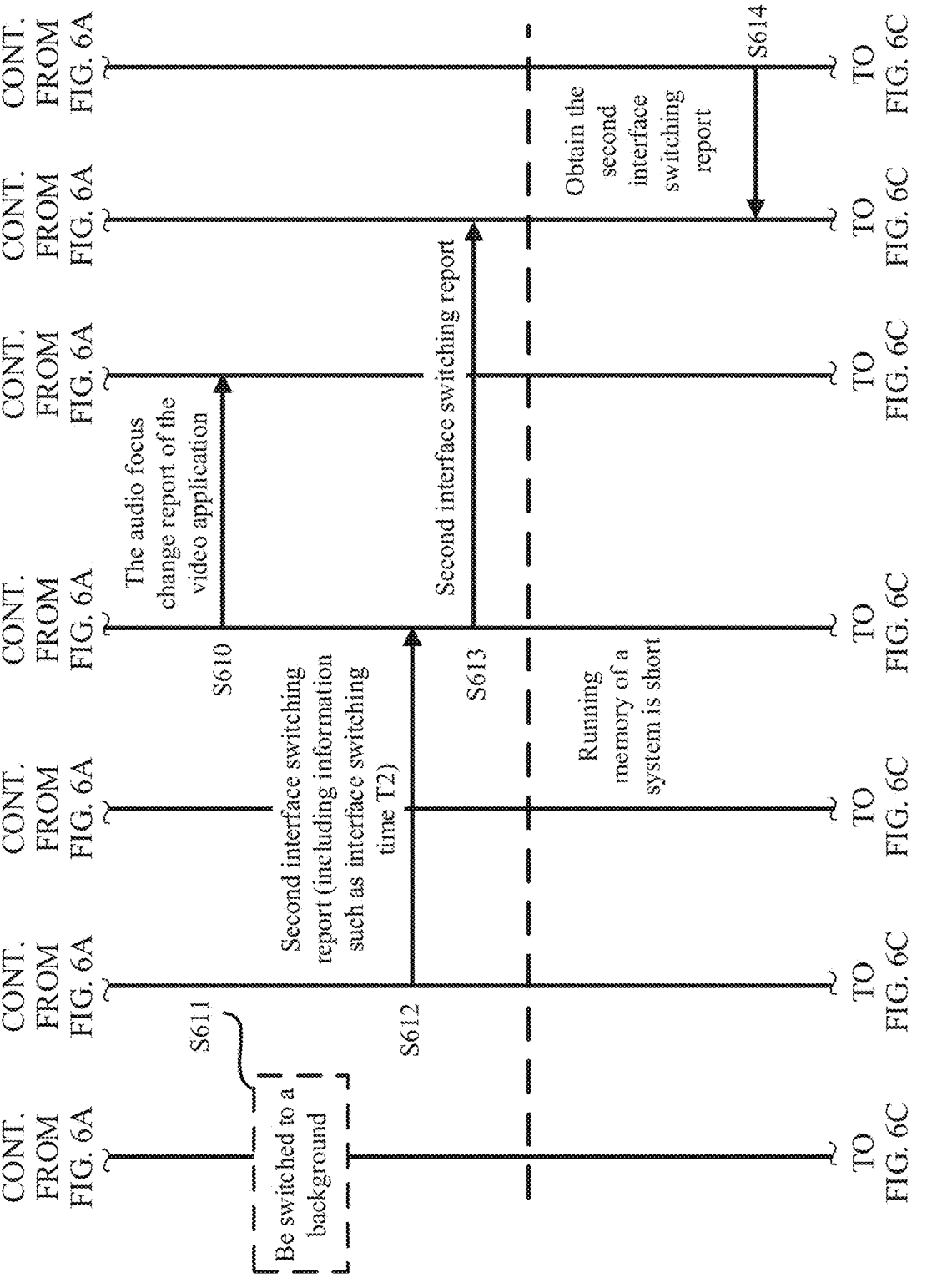

The foregoing embodiment of FIG. 4A to FIG. 4C describes a procedure in which the system keeps the video application alive when the running memory of the system is in a high-pressure state. With reference to FIG. 6A to FIG. 6C, the following describes a specific procedure of determining whether the video application is in a video hold state in the foregoing step S415. The specific procedure is as follows:

Step S601: An audio focus recognition module subscribes to an audio focus change event from an event management module.

Specifically, after the electronic device is powered on, the audio focus recognition module invokes a function Subcribe_Change (AudioEvent, AudioCallBack) to subscribe to the audio focus change event from the event management module. The AudioEvent is used to indicate that a subscribed event type is an audio focus change event, and the AudioCallBack is a callback function in the audio focus recognition module. In this way, after the event management module receives an audio focus change report of the video application sent by the AudioManager by invoking a function AudioFocus_Send1 ( ), the event management module may invoke the callback function AudioCallBack to send the audio focus change report to the audio focus recognition module.

Step S602: An application switching identification module subscribes to an interface switching change event from the event management module.

Specifically, after the electronic device is powered on, the application switching identification module invokes a function Subscribe Change (BoundarChange, BoundarCallBack) to subscribes to the interface switching change event from the event management module. The BoundarChange is used to indicate that the subscribed event type is an interface switching change event, and the BoundarCallBack is a callback function in the application switching identification module. In this way, when an interface or an application program is switched, the event management module invokes the function BoundarCallBack to send an interface switching change report to the application switching identification module.

It should be noted that step S601 may be performed before step S602, or may be performed after step S602, or may be performed simultaneously with step S602. This embodiment of this application is merely used as an example for description, and is not limited thereto.

Step S603: Start the video application.

Step S604: Enter the video playback interface.

For step S603 and step S604, refer to related descriptions of step S401 and step S402 in the foregoing embodiment of FIG. 4A to FIG. 4C. Details are not described herein again in this embodiment of this application.

Step S605: An ActivityManager sends a first interface switching report to the event management module.

Specifically, when the video application is switched from another interface to the video playback interface, a stack top Activity of a video application Activity stack is an Activity corresponding to the video playback interface. Code instrumentation may be performed on the ActivityManager in advance, that is, a piece of code is inserted into the ActivityManager. After the ActivityManager detects a change of the stack top Activity, the ActivityManager sends an interface switching report to the event management module. Taking an interface before the video application enters the video playback interface as the home screen as an example for description. An identifier of the video application is App_1, an interface identifier of the home screen is Act_1, and an interface identifier of the video playback interface is Act_2. After the video application switches from the home screen to the video playback interface, the ActivityManager may invoke a function Boundary_Send1 ( ) to send the first interface switching report to the event management module. The first interface switching report includes an interface identifier (Act_2) of a switching interface, a package name (App_1) of a switching interface application program, an interface identifier (Act_1) of a switched interface, a package name (App_1) of a switched interface application program, and a moment T3 at which the home screen is switched to the video playback interface.

Step S606: The event management module sends the first interface switching report to the application switching identification module.

Specifically, the event management module may send the first interface switching report to the application switching identification module by invoking the function BoundarCallBack.

Step S607: The video application requests an audio focus from the AudioManager.

Step S608: The AudioManager allocates the audio focus to the video application.

For step S607 and step S608, refer to related descriptions of step S403 and step S404 in the foregoing embodiment of FIG. 4A to FIG. 4C. Details are not described herein again in this embodiment of this application. A performing sequence of Step S605 and step S607 is not limited in this embodiment of this application.

Step S609: The AudioManager sends an audio focus change report of the video application to the event management module.

Specifically, code instrumentation may be performed on the ActivityManager, that is, a piece of code is inserted into the ActivityManager. When the AudioManager allocates or cancels an audio focus to an application program, the code runs. Then, the AudioManager invokes the function Audio-Focus_Send1 to send the audio focus change report of the application to the event management module. The audio focus change report of the video application includes the packet name (App_1) of the video application, a parameter Request, and a time (T1) for requesting the audio focus of the video application, and the Request is used to represent that the video application obtains the audio focus. For example, a form of the audio focus change report may be (App_1, Request, T1).

Step S610: The event management module sends the audio focus change report of the video application to the audio focus recognition module.

Specifically, the audio focus recognition module subscribes to the audio focus change event from the event management module after the electronic device is powered on. After receiving the audio focus change report of the video application sent by the AudioManager, the event management module invokes the function AudioCallBack to send the audio focus change report to the audio focus recognition module.

Step S611: The video application is switched to the background.

Specifically, the user may actively switch the video application to the background, or may start another application to run at the foreground, so that the video application is switched to the background. For example, the user receives an incoming call in a video watching process, and the video application is switched to run in the background. After the video application is switched to the background, the video application may release the audio focus, or may not release the audio focus. This is not limited in this embodiment of this application.

Step S612: The ActivityManager sends a second interface switching report to the event management module.

Specifically, when the video application is switched to the background, there is interface switching between two different application programs. For example, if the video application is switched to the background when playing a video, in this case, an application program that is switched to the foreground is a playback interface of a music application. In this case, the second interface switching report includes the package name (App_1) of the video application, the interface identifier (Act_2) of the video playback interface, a package name (for example, App_2) of the music application, an interface identifier (for example, Act_3) of the music playback interface, and a moment T2 at which the video application is switched to the background.

Step S613: The event management module sends the second interface switching report to the application switching identification module.

Specifically, the event management module may send the second interface switching report to the application switching identification module by invoking the function BoundarCallBack.

In a case in which the system is in a high-pressure state, step S415 specifically includes:

Step S614: The keepalive decision module obtains the second interface switching report from the application switching identification module.

Specifically, the keepalive decision module may obtain the second interface switching report by invoking a function Request_BoundarChange (App_1). App_1 is the packet name of the video application. The application switching module returns the latest interface switching report (the second interface switching report) of the video application based on the App_1 in the Request_BoundarChange.

Step S615: The keepalive decision module determines, based on the second interface switching report, whether an interface before the video application is switched to the background is a home screen.

Specifically, the keepalive decision module reads the Act_2 in the second interface switching report, and determines whether the Act_2 is consistent with the interface identifier of the home screen of the video application. If the two are inconsistent, it indicates that the interface before the video application is switched to the background is not the home screen, and step S616 is performed. If the two are consistent, it is determined that the video application is not in a video hold state.

Step S616: The keepalive decision module obtains the audio focus change report of the video application from the audio focus recognition module.

Specifically, the keepalive decision module may obtain the audio focus change report of the video application from the audio focus recognition module by invoking a function Request_AudioFocusChange (App_1).

Step S617: The keepalive decision module determines, based on the second interface switching report and the audio focus change report of the video application, whether duration in which the video application obtains the audio focus is greater than or equal to first duration.

Specifically, to rule out a scenario in which a stay time on the video playback interface is short, such as "quit the interface immediately after entering the playback interface", the keepalive decision module needs to determine whether the duration in which the video application obtains the audio focus is greater than the first duration. A specific calculation process is as follows: The keepalive decision module reads T1 in the audio focus change report and T2 in the second interface switching report, calculates a modulus value of T1 and T2, and determines whether the modulus value is greater than or equal to the first duration. If the modulus value is greater than or equal to the first duration, it is determined that the duration in which the video application obtains the audio focus is greater than or equal to the first duration; or if the modulus value is less than the first duration, it is determined that the duration in which the video application obtains the audio focus is less than the first duration.

Step S618: In a case in which duration in which the video application reserves the audio focus is greater than or equal to the first duration, the keepalive decision module determines that the video application is in a video hold state.

In this embodiment of this application, determining whether the video application is in a video hold state helps the keepalive decision module to determine whether the video application is a keepalive application program. When the video application is a keepalive application program, the video application is kept alive within the keepalive time, and when the user re-switches the video application back to the foreground within the keepalive time, the video application is in a video playback state before being switched, and a progress of the video is the same as a progress before the video application is switched. The user does not need to perform tedious operations such as starting the video application, searching for a video, and searching for historical viewing progress. This saves the user time and gives the user good experience.

Figure 7A:
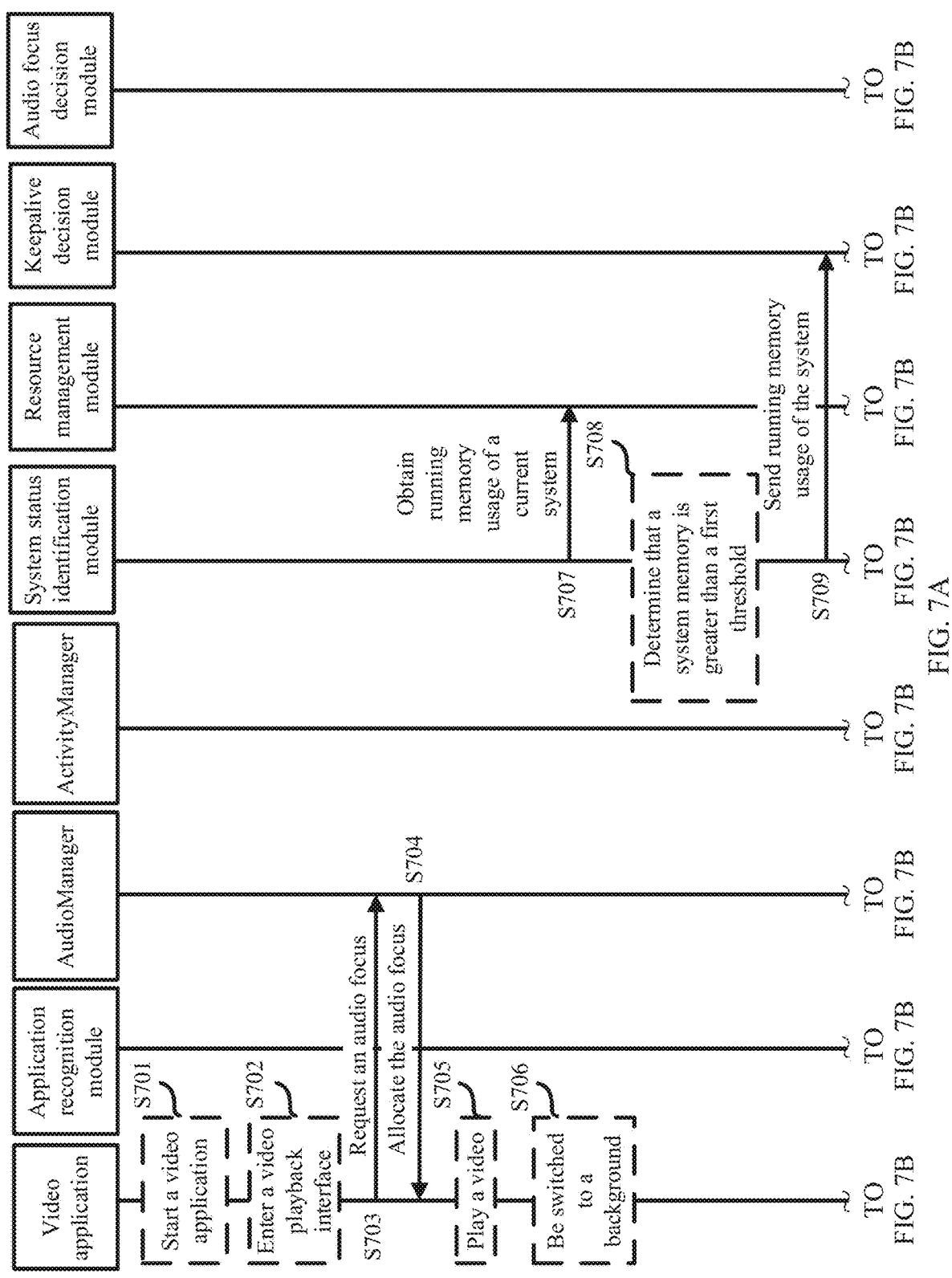
FIG. 7A to FIG. 7C are a flowchart of allocating an audio focus according to an embodiment of this application.
Figure 7B:
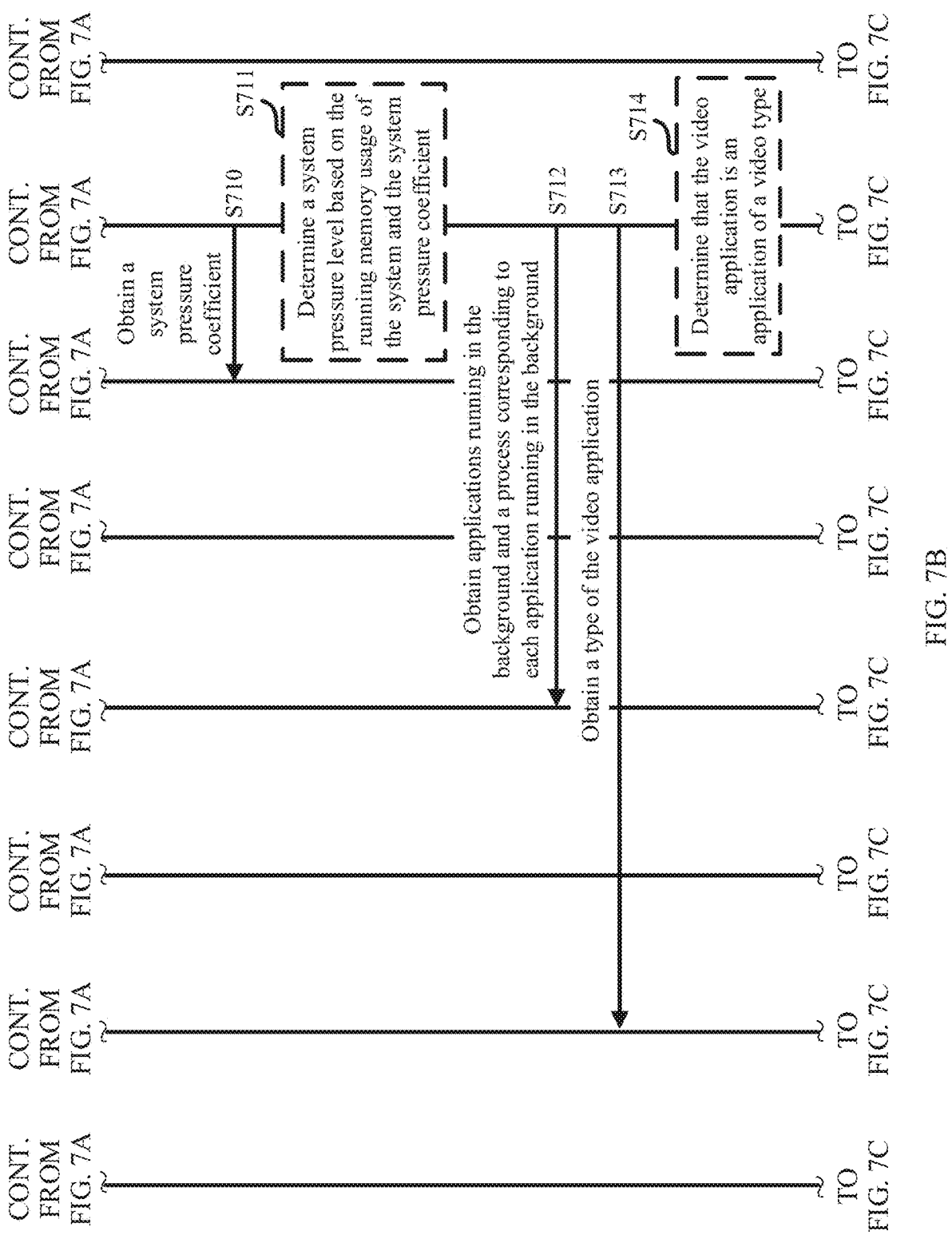
Figure 7C:
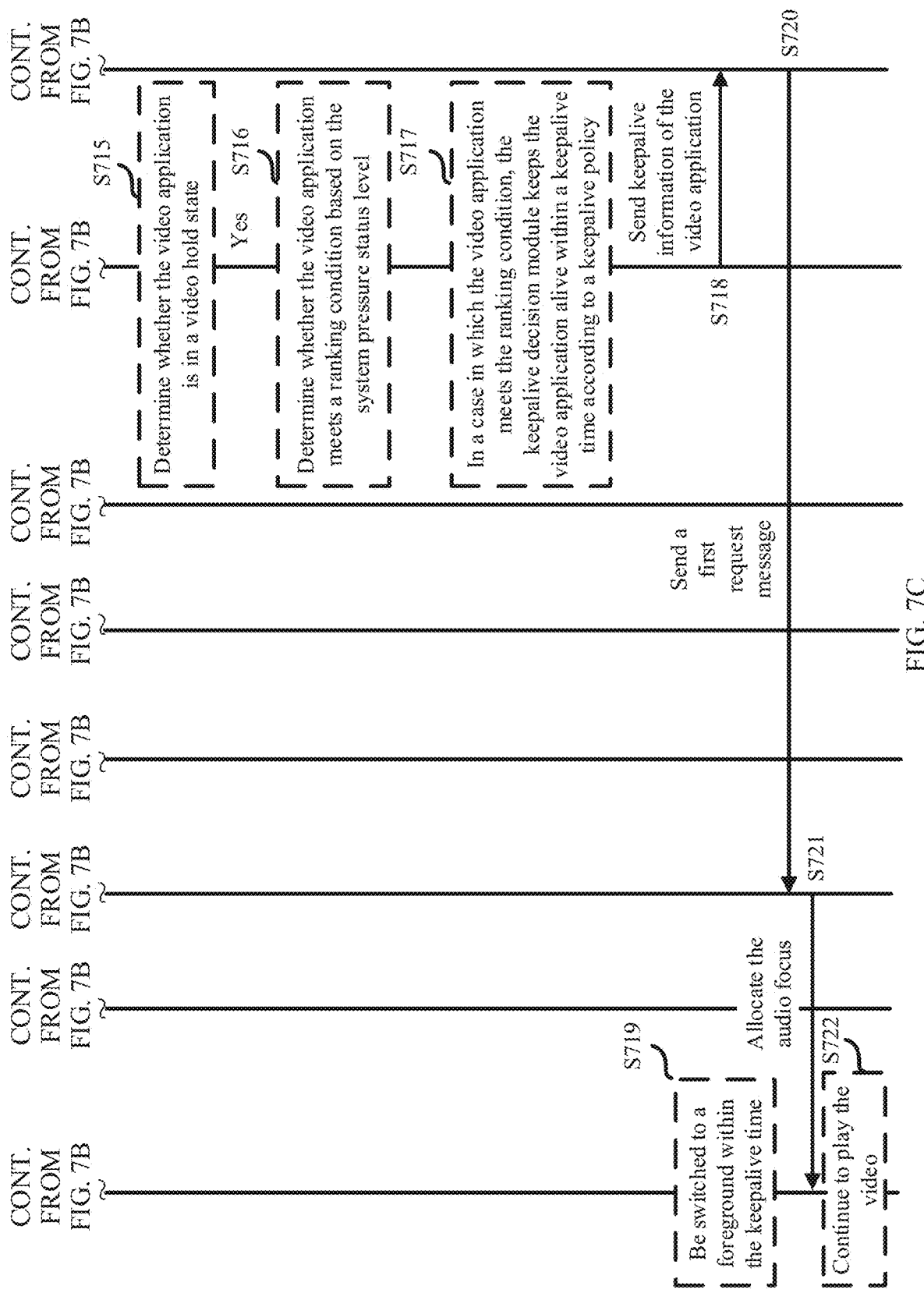

In the foregoing embodiment of FIG. 4A to FIG. 4C, when the video application is switched back to the foreground within the keepalive time, the video application requests the audio focus again. An embodiment of this application provides another method for allocating an audio focus to a video application that is re-switched to a foreground. The following describes another method for allocating an audio focus with reference to FIG. 7A to FIG. 7C. FIG. 7A to FIG. 7C are a flowchart of allocating an audio focus according to an embodiment of this application. A specific procedure is as follows:

Step S701: Start a video application.

Step S702: The video application enters a video playback interface.

Step S703: The video application requests an audio focus from an AudioManager.

Step S704: The AudioManager allocates the audio focus to the video application.

Step S705: The video application plays a video.

Step S706: The video application is switched to a background.

Step S707: A system status identification module obtains running memory usage of a current system from a resource management module.

Step S708: The system status identification module determines that the running memory usage of the system is greater than a first threshold.

Step S709: The system status identification module sends the running memory usage of the system to a keepalive decision module.

Step S710: The keepalive decision module obtains a system pressure coefficient from the resource management module.

Step S711: The keepalive decision module determines a system pressure level based on the running memory usage of the system and the system pressure coefficient.

Step S712: When the system is in a high-pressure state, the keepalive decision module obtains, from an Activity-manager, applications currently running in the background and a process corresponding to each application running in the background.

Step S713: The keepalive decision module obtains type information of the video application from an application recognition module.

Step S714: The keepalive decision module determines, based on the type information of the video application, that the video application is an application of a video type.

Step S715: The keepalive decision module determines whether the video application is in a video hold state.

Step S716: In a case in which it is determined that the video application is in a video hold state, the keepalive decision module determines, based on a system pressure state level, whether the video application meets a ranking condition.

Step S717: In a case in which the video application meets the ranking condition, the keepalive decision module keeps the video application alive within a keepalive time according to a keepalive policy.

For step S701 to step S717, refer to related descriptions of step S401 to step S417. Details are not described herein again in this embodiment of this application.

Step S718: The keepalive decision module sends keepalive information of the video application to an audio focus decision module.

Specifically, after determining a keepalive application program, the keepalive decision module invokes a function Save App to send the keepalive information (App_1, Save-Time) of the video application to the audio focus decision module. SaveTime is keepalive duration of the video application.

Step S719: The video application is switched to a foreground within the keepalive time.

Step S720: The audio focus decision module sends a first request message to the AudioManager based on the keepalive information.

Specifically, the first request message is used to instruct the AudioManage to allocate the audio focus to the video application, including a packet name App_1 of the video application. In step S706, if the video application releases the audio focus after being switched to the background, or another application requests the audio focus after the video application is switched to the background, the video application needs to obtain the audio focus after being switched to the foreground again.

Step S721: The AudioManager allocates the audio focus to the video application based on the first request message.

Step S722: The video application continues to play the video.

For step S722, refer to related descriptions in the foregoing step S419. Details are not described herein again in this embodiment of this application.

In a possible implementation, the system status identification module may alternatively be in the keepalive decision module, that is, the keepalive decision module may be configured to perform a function of the system status identification module. Specifically, the keepalive decision module may periodically invoke a function Memory Request to read the running memory usage of the system from the resource management module at a kernel layer. It is determined, based on the running memory usage of the system, whether the current system needs to clear the memory. If the system needs to be cleared, the system pressure coefficient is obtained by using the resource management module, and the keepalive decision module determines the system pressure level based on the running memory usage of the system and the system pressure coefficient.

For example, the keepalive decision module may alternatively obtain a usage rate of the system running memory and the system pressure coefficient at the same time, and determine the system pressure level based on the system running memory usage and the system pressure coefficient. For example, in a high-pressure state, it is determined whether the running memory usage of the system exceeds a second threshold. If the running memory usage of the system exceeds the second threshold, it is determined that the system status is a first-level pressure state; otherwise, the system status is a second-level pressure state. In actual application, a plurality of pressure state levels may be classified based on a specific case.

In a possible implementation, after the system status identification module obtains the running memory usage of the current system from the resource management module, the system status identification module may determine, based on whether the running memory usage exceeds the first threshold, whether the system needs to clear the memory. If the first threshold is exceeded, the memory needs to be cleared, and the system status identification module sends the running memory usage of the system to the keepalive decision module. Then, the keepalive decision module obtains the system pressure coefficient from the resource management module, and determines the system pressure level based on the system pressure coefficient. For example, the keepalive decision module determines whether the system pressure coefficients all reach a preset upper limit value. If the system pressure coefficients all reach the upper limit value, it is determined that the system pressure level is the first-level pressure; otherwise, it is the second-level pressure. Then, the keepalive decision module obtains, from the Activitymanager, applications currently running in the background and process corresponding to each application running in the background.

In a possible implementation, after the system status identification module sends the running memory usage of the system to the keepalive decision module, the keepalive decision module obtains, from the Activitymanager, applications currently running in the background and process corresponding to each application running in the background. Then, the keepalive decision module obtains a type of the video application from the application recognition module, and after determining that the video application is an application of a video type, determines whether the video application is in a video hold state. In a case in which it is determined that the video application is in a video hold state, the keepalive decision module obtains the system pressure coefficient from the resource management module, and determines the system pressure level based on the system pressure coefficient. Then, the keepalive decision module determines, based on the system pressure level, whether the video application meets the ranking condition.

In this embodiment of this application, an audio decision module reallocates the audio focus to the video application that is switched back to the foreground by using the Audio-Manager, so that the video application that is currently on a video playback interface can play audio.

In the foregoing embodiment of FIG. 7A to FIG. 7C, another method for allocating an audio focus to a video application that is switched to a foreground is described.

Figure 8A:
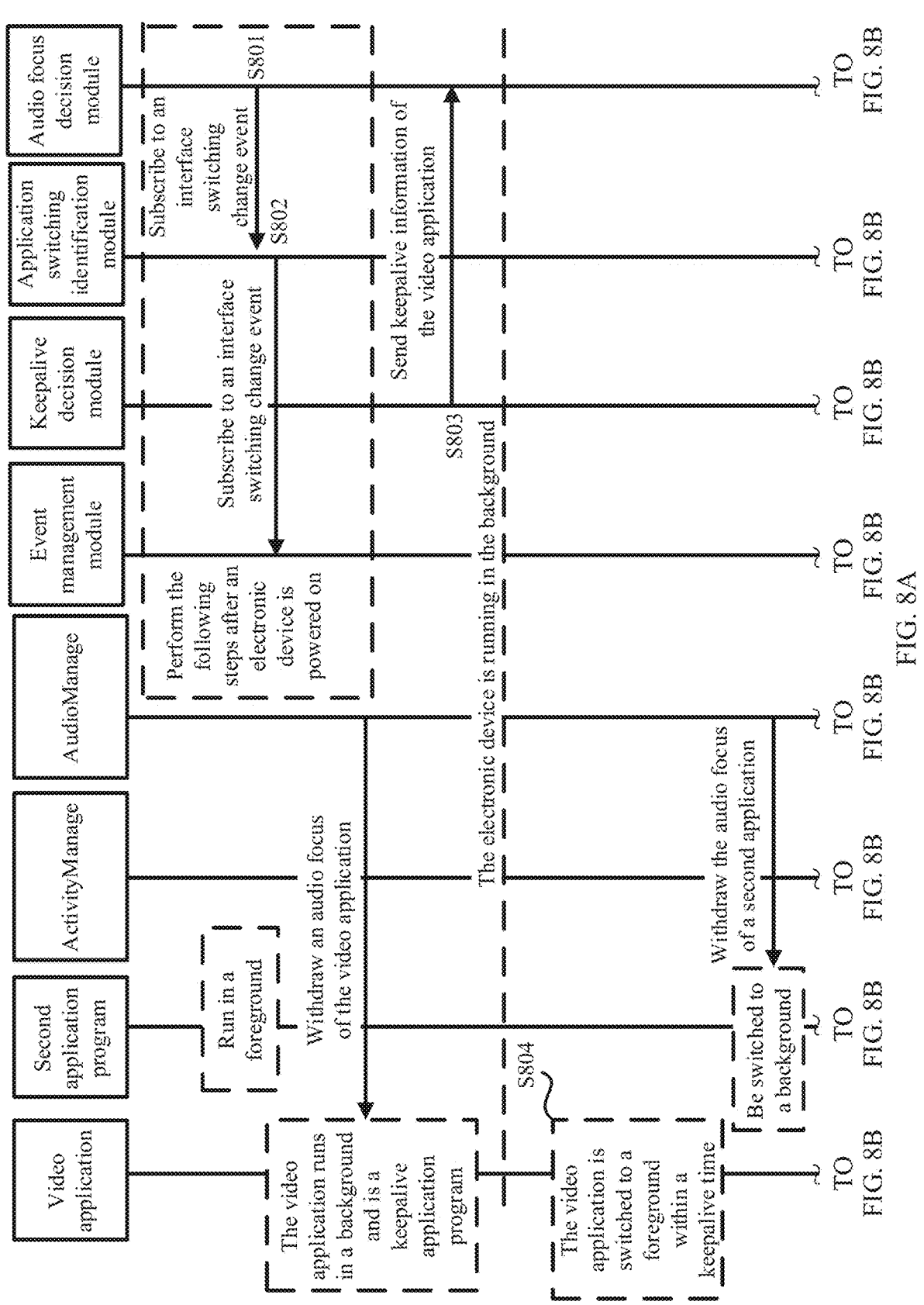
FIG. 8A and FIG. 8B are a flowchart of interaction between an audio focus decision module and an AudioManager according to an embodiment of this application.
Figure 8B:
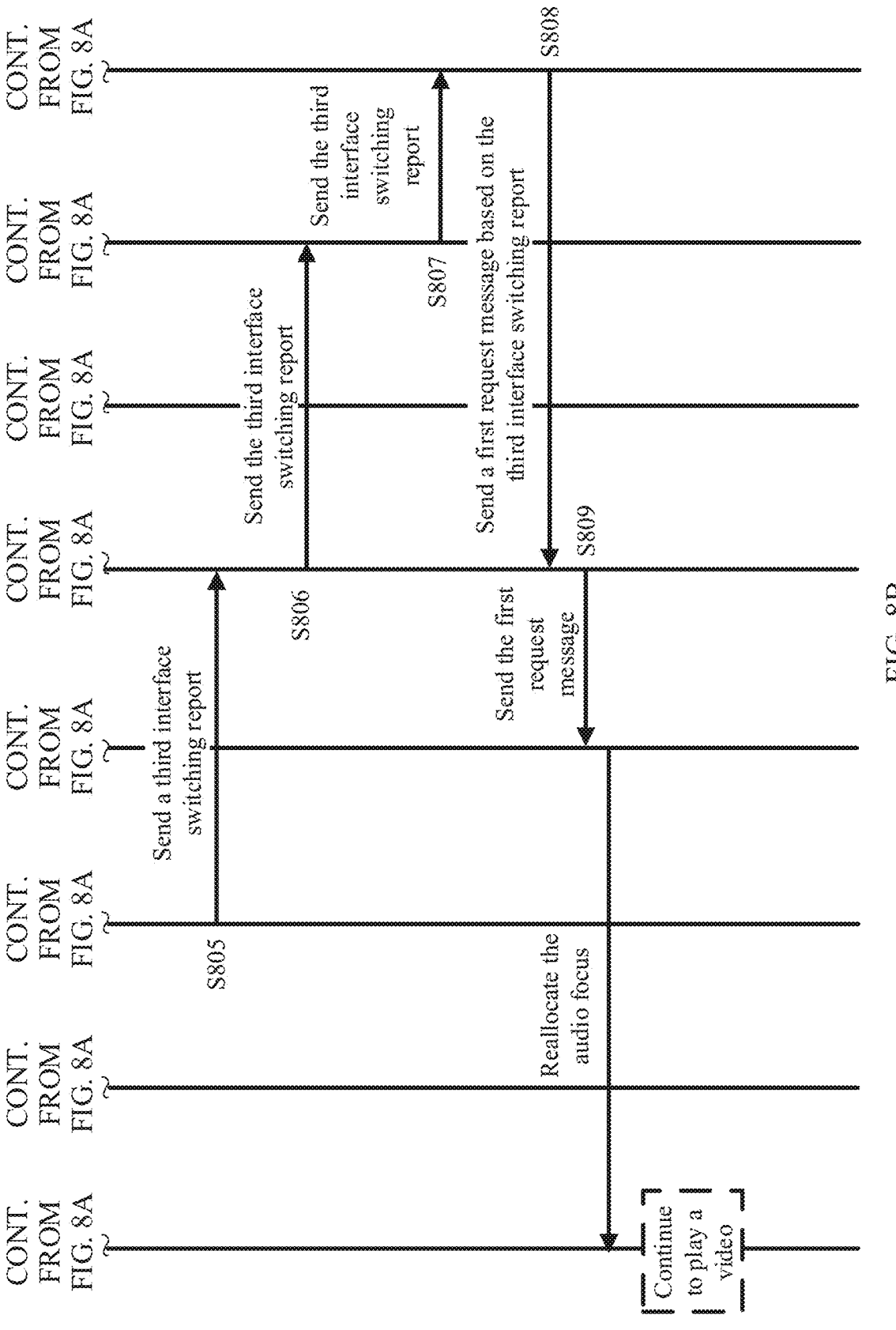

With reference to FIG. 8A and FIG. 8B, the following describes a specific procedure in which the audio focus decision module sends the first request message to the AudioManager based on the keepalive information in step S720. A specific procedure is as follows:

Step S801: The audio focus decision module subscribes to an application switching change event from an application switching identification module.

Specifically, when the electronic device is powered on, the audio focus decision module may invoke a function Subcribe_Change (AppChange, AppCallBack) to subscribe to the application switching change event from the application switching identification module. When an application program is switched, the audio decision module may monitor it by using the application switching identification module. The AppChange is used to indicate that a type of a subscription event is an application switching change event, and the AppCallBack is a callback function of the audio decision module.

Step S802: The application switching identification module subscribes to the interface switching change event from the event management module.

Specifically, for a specific process in which the application switching identification module subscribes to the interface switching change event from the event management module, refer to step S602. Details are not described herein again.

Step S803: The keepalive decision module sends the keepalive information of the video application to the audio focus decision module.

Specifically, for a process in which the keepalive decision module sends the keepalive information of the video application to the audio focus decision module, refer to step S719. Details are not described in this embodiment of this application.

Step S804: The video application is switched to the foreground within the keepalive time.

Step S805: The ActivityManager sends a third interface switching report to the event management module.

Specifically, the third interface switching report includes App_1, App_2, Act_a, Act_b, and T4. App_1 is the package name of the video application, App_2 is a package name of an application program that is switched to the background by the video application (a second application program), Act_a is identification information of a current working interface of the video application (a second interface identifier), Act_b is identification information of a switched interface (a first interface identifier), and T4 is an interface switching time. For example, a form of the third interface switching report may be (App_2, Act_b, App_1, Act_a, T4).

In a case in which the video application is switched to the foreground within the keepalive time, step S720 is specifically as follows:

Step S806: The event management module sends the third interface switching report to the application switching identification module.

Specifically, the event management module may send the third interface switching report to the application switching identification module by invoking a function BoundarCallBack.

Step S807: The application switching identification module sends the third interface switching report to the audio focus decision module.

Specifically, after receiving the third interface switching report, the application switching identification module compares the App_2 with the App_1 to find that the App_2 and the App_1 are inconsistent, and the application switching identification module determines that application switching occurs. The audio focus decision module subscribes to the application switching change event from the application switching identification module when the electronic device is powered on. Therefore, when recognizing that the video application is switched to the foreground is switching between application programs, the application switching identification module invokes the function AppCallBack to send the third interface switching report to the audio focus decision module.

Step S808: The audio focus decision module sends the first request message to the event management module based on the third interface switching report.

Specifically, after receiving an application switching change report, the audio decision module invokes the keepalive information of the video application, and determines that the video application is a keepalive application program based on App_1 in the third interface switching report. Then, the audio focus decision module may calculate a modulus value of T4 in the third interface switching report and a time T5 at which the keepalive information of the video application is received, and determine whether the modulus value is greater than SaveTime. If it is determined that the modulus value is not greater than SaveTime, the video application is switched back to the foreground within the keepalive time, and the audio focus decision module sends the first request message to the event management module. If it is determined that the modulus value is greater than SaveTime, the video application is not switched back to the foreground within the keepalive time, and the audio focus decision module does not send the first request message to the event management module.

Step S809: The event management module sends the first request message to the AudioManage.

Specifically, the event management module invokes a function AudioFocus_Distribut_1 (App_1) to send the first request message to the AudioManager.

In this embodiment of this application, the audio focus decision module sends the first request message to the AudioManager, so that the AudioManager allocates the audio focus to the application program, so that a video application currently on a video playback interface can play audio.

The foregoing embodiments may be implemented by software, hardware, firmware, or any combination thereof in whole or in part. When the foregoing embodiments are implemented by software, the foregoing embodiments may be implemented in full or in part in a form of a computer program product. The computer program product includes one or more computer instructions. When the computer program instruction is loaded and executed on a computer, a procedure or a function described in this application is completely or partially generated. The computer may be a general-purpose computer, a special-purpose computer, a computer network, or another programmable apparatus. The computer instruction may be stored in a computer-readable storage medium or transmitted from one computer-readable storage medium to another computer-readable storage medium, for example, the computer instruction may be transmitted from a website site, a computer, a server or a data center to another website site, another computer, another server or another data center in a wired (such as, a coaxial cable, optical fiber, a digital subscriber line) or wireless (such as, infrared, wireless, microwave) manner. The computer-readable storage medium may be any available medium that can be accessed by a computer, or a data storage device such as a server or a data center that includes an integration of one or more available medium. The available medium may be a magnetic medium (such as, a floppy disk, a hard disk, a magnetic tape), an optical medium (such as, a DVD), or a semiconductor medium (such as, a solid state disk Solid State Disk), or the like.

A person of ordinary skill in the art may understand that all or some of the procedures in the methods in the foregoing embodiments. The procedure may be completed by the computer program to instruct relevant hardware. The program may be stored in the computer-readable storage medium. When the program is executed, the procedure in the foregoing method embodiments may be included. The foregoing storage medium includes any medium that can store program code, such as a read-only memory (ROM) or a random access memory (RAM), a magnetic disk, or a compact disc.

In conclusion, the foregoing descriptions are merely embodiments of the technical solutions of the present disclosure, and are not intended to limit the protection scope of the present disclosure. Any modification, equivalent replacement, improvement, and the like made in accordance with the disclosure of the present disclosure shall be included in the protection scope of the present disclosure.

What is claimed is:

1. A video application keepalive method, the method comprising:

displaying a main interface of a video application on an electronic device;

receiving a first operation of a user on a first video in the main interface of the video application;

displaying a playback interface of the first video in response to the first operation;

switching the video application to a background;

determining a system stress level of the electronic device;

determining whether the video application satisfies a ranking condition based on the system stress level of the electronic device, wherein the determining whether the video application satisfies the ranking condition based on the system stress level of the electronic device comprises:

acquiring a system pressure coefficient of the electronic device, wherein the system pressure coefficient of the electronic device includes at least one of: an input/output (IO) pressure coefficient of the electronic device, a central processing unit (CPU) pressure coefficient of the electronic device, or a memory pressure coefficient of the electronic device;

obtaining a memory usage of a system operation of the electronic device; and determining the system stress level of the electronic device according to the system pressure coefficient of the electronic device and the memory usage of the system operation of the electronic device, wherein the determining the system stress level of the electronic device according to the system pressure coefficient of the electronic device and the memory usage of the system operation of the electronic device comprises:

based on the system pressure coefficient of the electronic device being greater than a fourth threshold and the memory usage of the system operation of the electronic device being greater than or equal to a fifth threshold, determining that the system stress level of the electronic device is a first-level stress; and based on the system pressure coefficient of the electronic device being greater than the fourth threshold and the memory usage of the system operation of the electronic device being less than the fifth threshold, determining that the system stress level of the electronic device is a secondary stress;

based on the video application satisfying the ranking condition and a duration from receiving the first operation to the switching the video application to the background being greater than or equal to a first preset threshold, keeping alive the video application; and based on the duration from receiving the first operation to the switching the video application to the background being less than the first preset threshold, not keeping alive the video application.

2. The method according to claim 1, wherein the displaying the main interface of the video application comprises:

receiving a second operation of the user on an application icon of the video application; and in response to the second operation, displaying the main interface of the video application.

3. The method according to claim 1, wherein the switching the video application to the background comprises:

receiving a third operation of the user on the video application; and in response to the third operation, switching the video application to the background.

4. The method according to claim 1, wherein the switching the video application to the background comprises:

receiving an incoming call; and in response to the incoming call, switching the video application to the background.

5. The method according to claim 1, wherein at a time when the video application is switched to the background, a playback progress of the video application is a first progress, the method further comprising:

switching the video application to a foreground after keeping the video application alive;

wherein in response to the switching the video application to the foreground, the video application continues to play video content of the first video from the first progress.

6. The method according to claim 1, wherein while the video application displays the playback interface of the first video, the video application applies for audio focus; and wherein keeping alive the video application comprises:

based on the video application satisfying the ranking condition and a time difference between time T1 and time T2 being greater than or equal to the first preset threshold, keeping alive the video application, wherein the time T1 is a time at which the video application applies for audio focus, and the time T2 is a time at which the video application is switched to the background.

7. The method according to claim 1, wherein the determining whether the video application satisfies the ranking condition based on the system stress level of the electronic device comprises:

determining that the video application satisfies the ranking condition based on the system stress level of the electronic device being the first-level stress and a ranking of the video application in a first application queue is within a second threshold; or determining that the video application satisfies the ranking condition based on the system stress level of the electronic device being the secondary stress and the ranking of the video application in the first application queue is within a third threshold, wherein the first-level stress is greater than the secondary stress.

8. The method according to claim 1, further comprising: determining that the memory usage of a system operation of the electronic device is greater than a first threshold, before keeping alive the video application.

9. An electronic device, comprising:

a touch screen;

one or more processors; and one or more memories, wherein the one or more processors are coupled to the touch screen and the one or more memories, wherein the one or more memories are configured to store computer program code that includes computer instructions, and when the one or more processors execute the computer instructions, the electronic device performs operations comprising:

displaying a main interface of a video application on the electronic device;

receiving a first operation of a user on a first video in the main interface of the video application;

displaying a playback interface of the first video in response to the first operation;

switching the video application to a background;

determining a system stress level of the electronic device;

determining whether the video application satisfies a ranking condition based on the system stress level of the electronic device, wherein the determining whether the video application satisfies the ranking condition based on the system stress level of the electronic device comprises:

acquiring a system pressure coefficient of the electronic device, wherein the system pressure coefficient of the electronic device includes at least one of: an input/output (IO) pressure coefficient of the electronic device, a central processing unit (CPU) pressure coefficient of the electronic device, or a memory pressure coefficient of the electronic device;

obtaining a memory usage of a system operation of the electronic device; and determining the system stress level of the electronic device according to the system pressure coefficient of the electronic device and the memory usage of the system operation of the electronic device, wherein the determining the system stress level of the electronic device according to the system pressure coefficient of the electronic device and the memory usage of the system operation of the electronic device comprises:

based on the system pressure coefficient of the electronic device being greater than a fourth threshold and the memory usage of the system operation of the electronic device being greater than or equal to a fifth threshold, determining that the system stress level of the electronic device is a first-level stress; and based on the system pressure coefficient of the electronic device being greater than the fourth threshold and the memory usage of the system operation of the electronic device being less than the fifth threshold, determining that the system stress level of the electronic device is a secondary stress;

based on the video application satisfying the ranking condition and a duration from receiving the first operation to the switching the video application to the background being greater than or equal to a first preset threshold, keeping alive the video application; and based on the duration from receiving the first operation to the switching the video application to the background being less than the first preset threshold, not keeping alive the video application.

10. The electronic device according to claim 9, wherein the displaying the main interface of the video application comprises:

receiving a second operation of the user on an application icon of the video application; and in response to the second operation, displaying the main interface of the video application.

11. The electronic device according to claim 9, wherein the switching the video application to the background comprises:

receiving a third operation of the user on the video application; and in response to the third operation, switching the video application to the background.

12. The electronic device according to claim 9, wherein the switching the video application to the background comprises:

receiving an incoming call; and in response to the incoming call, switching the video application to the background.

13. The electronic device according to claim 9, wherein at a time when the video application is switched to the background, a playback progress of the video application is a first progress, and when the one or more processors execute the computer instructions, the electronic device further performs operations comprising:

switching the video application to a foreground after keeping the video application alive;

wherein in response to the switching the video application to the foreground, the video application continues to play video content of the first video from the first progress.

14. The electronic device according to claim 9, wherein while the video application displays the playback interface of the first video, the video application applies for audio focus; and wherein keeping alive the video application comprises:

based on the video application satisfying the ranking condition and a time difference between time T1 and time T2 being greater than or equal to the first preset threshold, keeping alive the video application, wherein the time T1 is a time at which the video application applies for audio focus, and the time T2 is a time at which the video application is switched to the background.

15. A non-transitory computer-readable storage medium storing instructions that, when executed on an electronic device, cause the electronic device to perform operations comprising:

displaying a main interface of a video application on the electronic device;

receiving a first operation of a user on a first video in the main interface of the video application;

displaying a playback interface of the first video in response to the first operation;

switching the video application to a background;

determining a system stress level of the electronic device;

determining whether the video application satisfies a ranking condition based on the system stress level of the electronic device, wherein the determining whether the video application satisfies the ranking condition based on the system stress level of the electronic device comprises:

acquiring a system pressure coefficient of the electronic device, wherein the system pressure coefficient of the electronic device includes at least one of: an input/output (IO) pressure coefficient of the electronic device, a central processing unit (CPU) pressure coefficient of the electronic device, or a memory pressure coefficient of the electronic device;

obtaining a memory usage of a system operation of the electronic device; and determining the system stress level of the electronic device according to the system pressure coefficient of the electronic device and the memory usage of the system operation of the electronic device, wherein the determining the system stress level of the electronic device according to the system pressure coefficient of the electronic device and the memory usage of the system operation of the electronic device comprises:

based on the system pressure coefficient of the electronic device being greater than a fourth threshold and the memory usage of the system operation of the electronic device being greater than or equal to a fifth threshold, determining that the system stress level of the electronic device is a first-level stress; and based on the system pressure coefficient of the electronic device being greater than the fourth threshold and the memory usage of the system operation of the electronic device being less than the fifth threshold, determining that the system stress level of the electronic device is a secondary stress;

based on the video application satisfying the ranking condition and a duration from receiving the first operation to the switching the video application to the background being greater than or equal to a first preset threshold, keeping alive the video application; and based on the duration from receiving the first operation to the switching the video application to the background being less than the first preset threshold, not keeping alive the video application.

16. The computer-readable storage medium according to claim 15, wherein the displaying the main interface of the video application comprises:

receiving a second operation of the user on an application icon of the video application; and in response to the second operation, displaying the main interface of the video application.

17. The computer-readable storage medium according to claim 15, wherein the switching the video application to the background comprises:

receiving a third operation of the user on the video application; and in response to the third operation, switching the video application to the background.

18. The computer-readable storage medium according to claim 15, wherein the switching the video application to the background comprises:

receiving an incoming call; and in response to the incoming call, switching the video application to the background.

19. The computer-readable storage medium according to claim 15, wherein at a time when the video application is switched to the background, a playback progress of the video application is a first progress, and wherein the instructions, when executed on the electronic device, cause the electronic device to perform operations comprising:

switching the video application to a foreground after keeping the video application alive;

wherein in response to the switching the video application to the foreground, the video application continues to play video content of the first video from the first progress.

20. The computer-readable storage medium according to claim 15, wherein while the video application displays the playback interface of the first video, the video application applies for audio focus; and wherein keeping alive the video application comprises:

based on the video application satisfying the ranking condition and to a time difference between time T1 and time T2 being greater than or equal to the first preset threshold, keeping alive the video application, wherein the time T1 is a time at which the video application applies for audio focus, and the time T2 is a time at which the video application is switched to the background.

\* \* \* \* \*